(12) United States Patent
Lay et al.

(10) Patent No.: US 11,061,755 B1
(45) Date of Patent: *Jul. 13, 2021

(54) APPLICATION HEALTH MONITORING AND REPORTING

(71) Applicant: State Farm Mutual Automobile Insurance Company, Bloomington, IL (US)

(72) Inventors: Chris Lay, Bloomington, IL (US); Cory Steers, Bloomington, IL (US); Garrett Weston, Bloomington, IL (US); Shane Cisco, Bloomington, IL (US); Brandon Dorn, Bloomington, IL (US); Chad Skinner, Normal, IL (US); Thad G Craft, Heyworth, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 61 days.

This patent is subject to a terminal disclaimer.

(21) Appl. No.: 16/507,760

(22) Filed: Jul. 10, 2019

Related U.S. Application Data

(63) Continuation of application No. 14/921,144, filed on Oct. 23, 2015, now Pat. No. 10,394,638.
(Continued)

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0706* (2013.01); *G06F 11/0751* (2013.01);
(Continued)

(58) Field of Classification Search
CPC .... G06F 11/079; G06F 11/3075; G06F 11/32; G06F 11/321; G06F 11/324; G06F 11/327; G06F 11/328
See application file for complete search history.

(56) References Cited

U.S. PATENT DOCUMENTS

| | | |
|---|---|---|
| 6,070,190 A | 5/2000 | Reps |
| 6,901,582 B1 | 5/2005 | Harrison |

(Continued)

*Primary Examiner* — Philip Guyton
(74) *Attorney, Agent, or Firm* — Marshall, Gerstein & Borun LLP

(57) ABSTRACT

A method may include retrieving data about the health of a plurality of applications executing in a computing environment. The method may also include determining a plurality of indications of health based upon the data about the health of the plurality of applications, and determining an indication of an overall health of a portion of the computing environment based upon the plurality of indications of health of the plurality of applications. Still further, the method may include generating a plurality of visual elements to be displayed on remote user devices, where the plurality of visual elements may present the indications of health and/or the indication of overall health, and sending the plurality of visual elements to at least one of the remote user devices. The health indications may include both availability (expressed as a percentage) and performance (expressed as time) indications of health.

20 Claims, 16 Drawing Sheets

Related U.S. Application Data

(60) Provisional application No. 62/069,013, filed on Oct. 27, 2014.

(51) Int. Cl.
  *G06F 11/30* (2006.01)
  *G06F 11/32* (2006.01)

(52) U.S. Cl.
  CPC ...... *G06F 11/0772* (2013.01); *G06F 11/0784* (2013.01); *G06F 11/3075* (2013.01); *G06F 11/32* (2013.01); *G06F 11/321* (2013.01)

(56) References Cited

U.S. PATENT DOCUMENTS

| | | |
|---|---|---|
| 8,352,310 B1 | 1/2013 | Bessler |
| 10,394,638 B1 * | 8/2019 | Lay ..................... G06F 11/3075 |
| 2005/0228880 A1 * | 10/2005 | Champlin ........... G06F 11/3447 |
| | | 709/224 |
| 2007/0094281 A1 | 4/2007 | Malloy |
| 2015/0121154 A1 * | 4/2015 | Goutam ................ G06F 11/321 |
| | | 714/47.3 |

* cited by examiner

FIG. 2

Filter Report

Production | All DCs | All Pods 99.99%
Production — 220

⎫
⎬ 202
⎭

Application 1
1.0.15-RC-3 — 206b | Application | prod | www — 208b
97.25% | 8.52 ms
Availability / 4 hrs. | Performance / 4 hrs.
Last Updated at | Last Updated at
14 Jul 08:40 AM | 14 Jul 08:40 AM

Application 2
1.0.29-RC-3 — 206b | Application | prod | www
82.10% | 185.2 ms
Availability / 4 hrs. | Performance / 4 hrs.
Last Updated at | Last Updated at
14 Jul 08:40 AM | 14 Jul 08:40 AM

Application 3
1.0.15-RC-3 | Application | prod | www
99.99% | 51.93 ms
Availability / 4 hrs. | Performance / 4 hrs.
Last Updated at | Last Updated at
14 Jul 08:40 AM | 14 Jul 08:40 AM

Application 4
1.0.15-RC-3 | Application | prod | www
99.99% | 53.76 ms
Availability / 4 hrs. | Performance / 4 hrs.
Last Updated at | Last Updated at
14 Jul 08:40 AM | 14 Jul 08:40 AM

Application 5
1.0.0-RC-73 | Application | prod | www
90.51% | 9.61 ms
Availability / 4 hrs. | Performance / 4 hrs.
Last Updated at | Last Updated at
14 Jul 08:40 AM | 14 Jul 08:40 AM

Application 6
1.0.1-RC-90 | Application | prod | www
0.0% | 112.0 ms
Availability / 4 hrs. | Performance / 4 hrs.
Last Updated at | Last Updated at
14 Jul 08:40 AM | 14 Jul 08:40 AM

Application 7
1.0.0-RC-90 | Application | prod | www
98.61% | 191.97 ms
Availability / 4 hrs. | Performance / 4 hrs.
Last Updated at | Last Updated at
14 Jul 08:40 AM | 14 Jul 08:40 AM

Application 8
1.0.0-RC-49 | Application | prod | www
99.99% | 10.46 ms
Availability / 4 hrs. | Performance / 4 hrs.
Last Updated at | Last Updated at
14 Jul 08:40 AM | 14 Jul 08:40 AM

Application 9
1.0.1-RC-92 | Application | prod | www
97.55% | 837.96 ms
Availability / 4 hrs. | Performance / 4 hrs.
Last Updated at | Last Updated at
14 Jul 08:40 AM | 14 Jul 08:40 AM Search Optics
Alphabetical

| agreement | DC 2/3 |

PRICING

32.1 TB Total Storage + 1.7 TB Total Memory = $5.9 K Total Allocation price/day = $177.4 K Total Allocation price/month = $2.16 K Total Allocation price/year

ENVIRONMENT

| dev-int | system | performance | pre-production | production |
|---|---|---|---|---|
| 73 virtual machines | 234 virtual machines | 74 virtual machines | 64 virtual machines | 63 virtual machines |
| 41 tc Server | 84 tc Server | 18 tc Server | 12 tc Server | 12 tc Server |
| 21 Mule | 114 Mule | 22 Mule | 12 Mule | 12 Mule |
| 3 Database | 9 Database | 9 Database | 9 Database | 9 Database |
| 5 GemFire | 21 GemFire | 20 GemFire | 20 GemFire | 21 GemFire |
| 3 Misc | 6 Misc | 5 Misc | 6 Misc | 9 Misc |
| 25 unique deployable versions | 9 unique deployable versions | 7 unique deployable versions | 5 unique deployable versions | 4 unique deployable versions |
| 6 VMs not associated to a VIP | 0 VMs not associated to a VIP | 0 VMs not associated to a VIP | 0 VMs not associated to a VIP | 0 VMs not associated to a VIP |
| Usage 215.0GB Memory 4.13 TB Storage | Usage 662.0GB Memory 13.0 TB Storage | Usage 266.0GB Memory 5.15 TB Storage | Usage 298.0GB Memory 5.01 TB Storage | Usage 278.0GB Memory 4.79 TB Storage |
| $739 Estimated daily usage price | $2.3K Estimated daily usage price | $915 Estimated daily usage price | $1.0K Estimated daily usage price | $956 Estimated daily usage price |
| 1102a | 1102b | 1102c | 1102d | 1102e |

*FIG. 11*

Applicaton 14
1.0.4-RELEASE                                                                                              digital pod

| DESCRIPTION | ENVIRONMENT | | | | |
|---|---|---|---|---|---|
| | dev-int | performance | pre-production | production | |
| ☁ Availability ▸ The ability of an application to respond to consumer requests when used, as an average per interval. | 97.76% | 99.99% | 95.72% | 79.25% | }1204a |
| ⏱ Performance ▸ The response time of unique transactions through the application as an average per interval. | 9.16ms | 7.21ms | 24.07ms | 11.13ms | }1204b |
| ⊙ Throughput ▸ The average of the number of transactions executed per interval as transactions per second (TPS). | 0.01tps | <.01tps | <.01tps | 0.23tps | }1204c |
| ➤ Hits Total count of unique transactions. | 42.5K hits | 12.3K hits | 2.8K hits | 914.6K hits | }1204d |
| ☐ Failures ▸ The total number of failures that impact customer experience per interval. | 952 failures | 0 failures | 120 failures | 189.7K failures | }1204e |
| ⚑ Exceptions ▸ The total number of logged exceptions per interval. | 0 exceptions | 0 exceptions | 1 exceptions | 0 exceptions | }1204f |

Pricing Report

Computing Environment
Amounts in cost per day unless otherwise noted.

| DC | DVNT | SYST | PERF | PREP | PROD | DAILY TOTAL | MONTHLY TOTAL | YEARLY TOTAL |
|---|---|---|---|---|---|---|---|---|
| DC 2/3 | $8.1K | $16.4K | $7.4K | $6.9K | $7.6K | $46.4K | $1.39M | $16.93M |
| DC10 | $3.3K | $10.8K | $5.6K | $4.6K | $3.6K | $27.9K | $838.7K | $10.19M |
| DC5 | $3.3K | $11.3K | $3.1K | $3.0K | $3.0K | $23.7K | $710.8K | $8.65M |
| BAF | $3.1K | $7.5K | $3.7K | $2.9K | $2.4K | $19.7K | $590.2K | $7.18M |
| DC8 | $3.0K | $8.6K | $2.6K | $2.2K | $2.4K | $18.8K | $563.1K | $6.85M |
| DC1 | $2.0K | $5.1K | $1.4K | $1.0K | $577 | $10.1K | $302.8K | $3.68M |
| DC4 | $839 | $2.0K | $1.6K | $1.0K | N/A | $5.5K | $164.0K | $2.00M |
| DC7 | $419 | $1.1K | $378 | $368 | $361 | $2.6K | $77.5K | $942.4K |
| DC6 | $1.0K | $1.0K | N/A | N/A | N/A | $2.0K | $61.3K | $745.3K |
| HDM | $192 | N/A | N/A | N/A | N/A | $192 | $5.8K | $70.1K |
|  |  |  |  |  |  | $156.8K | $4.70M | $57.24M |

The table above shows pricing data aggregated for each DC consuming Comp. Environment services on a per-day basis.

DC 1
Amounts in cost per day unless otherwise noted.

| POD | DVNT | SYST | PERF | PREP | PROD | DAILY TOTAL | MONTHLY TOTAL | YEARLY TOTAL |
|---|---|---|---|---|---|---|---|---|
| cromsvcs | $1.6K | $4.7K | $1.4K | $1.0K | $577 | $9.4K | $281.6K | $3.43M |
| customer | $319 | $388 | N/A | N/A | N/A | $707 | $21.2K | $258.1K |
|  |  |  |  |  |  | $10.1K | $302.8K | $3.68M |

*FIG. 13*

APPLICATION HEALTH MONITORING AND REPORTING

CROSS-REFERENCE TO RELATED APPLICATIONS

This application is a continuation of, and claims the benefit of, U.S. patent application Ser. No. 14/921,144, filed Oct. 23, 2015 and entitled "Application Health Monitoring and Reporting," which claims the benefit of U.S. Provisional Application No. 62/069,013, entitled "APPLICATION HEALTH MONITORING AND REPORTING" which was filed on Oct. 27, 2014, the disclosures of both of which are hereby incorporated herein by reference in their entireties for all purposes.

TECHNICAL FIELD

The present disclosure generally relates to monitoring applications implemented in a computing environment, and, more particularly, to conveying health information about applications implemented in a computing environment to users of the computing environment.

BACKGROUND

Currently, a variety of tools are available that allow developers, administrators, etc. to examine specific data related to the availability or performance of an application implemented in a computing environment. In particular, developers of applications implemented in a computing environment or parties administrating a computing environment may utilize certain tools to analyze log files generated by applications, monitor web pages generated by applications, and identify errors or erratic behavior of applications.

However, to assess the health of a variety of types of applications implemented across geographically or technically distinct portions of a computing environment, administrators or developers typically need to employ a number of dissimilar tools. Often, each of these dissimilar tools measures application health, such as availability and/or performance of an application, differently than other of the multiple tools, and each of these dissimilar tools presents indications of measured application health via an interface or output type unique to the respective tool. As such, generated indications of health for the variety of types of applications are not directly comparable, and administrators and developers are forced to familiarize themselves with many different metrics and interfaces.

BRIEF SUMMARY

The present embodiments may, inter alia, assess and present information about the health of a plurality of applications implemented across geographically and/or technically distinct portions of a computing environment. The present embodiments may automatically aggregate comparable health information for the plurality of applications and/or allow developers and/or administrators to efficiently view, filter, and search for relevant health information for a single application, multiple applications implemented in a particular portion of the computing environment, and/or all applications implemented across all portions of a computing environment.

In one aspect, a computer-implemented method may include retrieving, via a computer network, data about the health of a plurality of applications executing in a computing environment, wherein at least some of the data about the health of the plurality of applications may be generated while at least some of the plurality of applications are performing respective functions in the computing environment. The computer-implemented method may also include determining, by a one or more processors, a plurality of indications of health based upon the data about the health of the plurality of applications, each of the plurality of indications of health may correspond to one of the plurality of applications, and each of the plurality of indications of health may indicate one of: (i) an availability of the corresponding one of the plurality of applications to perform the respective functions of the corresponding one of the plurality of applications, or (ii) a performance of the corresponding one of the plurality of applications in performing the respective functions of the corresponding one of the plurality of applications. Still further, the computer-implemented method may include determining, by the one or more processors, an indication of an overall health of a portion of the computing environment based upon the plurality of indications of health of the plurality of applications. The portion of the computing environment may implement two or more of the plurality of applications. The computer-implemented method may further include generating, by the one or more processors, a plurality of visual elements to be displayed on remote user devices. One of the plurality of visual elements may present the indication of the overall health of the portion of the computing environment, and other of the plurality of visual elements may present at least some of the plurality of indications of health of the plurality of applications. Still further, the computer-implemented method may include sending, via the computer network, the plurality of visual elements to at least one of the remote user devices. The computer-implemented method may include additional, fewer, or alternate actions, including those discussed elsewhere herein.

In another aspect, a computer device may include one or more processors and one or more non-transitory memories coupled to the one or more processors. The one or more non-transitory memories may include computer executable instructions stored therein that, when executed by the one or more processors, cause the one or more processors to receive, from one or more monitoring devices via a computer network, data about the health of a plurality of applications executing in a computing environment. At least some of the data about the health of the plurality of applications may be generated while the plurality of applications are performing respective functions in the computing environment. Further, the computer executable instructions may cause the one or more processors to determine, based upon the data about the health of the plurality of applications, a value of at least one standard health metric for each of the plurality of applications. The at least one standard health metric may be defined in the same manner for all of the plurality of applications, and the at least one standard health metric may be a measure of one of: (i) an availability to perform the respective functions in the computing environment, or (ii) a performance in performing the respective functions in the computing environment. The computer executable instructions may also cause the one or more processors to receive, from a remote user device, a request for a health report summarizing the health of one of one or more of the plurality of applications or a portion of the computing environment, generate the health report based upon the values of the at least one standard health metric for the plurality of applications, and/or send, via the computer network, the generated health report to the remote user device. The computer device may include additional, less, or alternate functionality, including that discussed elsewhere herein.

BRIEF DESCRIPTION OF THE DRAWINGS

There are shown in the drawings arrangements which are presently discussed, it being understood, however, that the present aspects are not limited to the precise arrangements and instrumentalities shown, wherein:

FIG. 2 illustrates an exemplary virtual dashboard including visual elements that present indications of health for a plurality of applications;

FIGS. 10A, 10B, and 10C illustrate exemplary elements of a virtual dashboard allowing users to request reports;

FIG. 11 illustrates an exemplary modular component report;

FIG. 12 illustrates an exemplary application report;

FIG. 13 illustrates an exemplary pricing report; and

Figure 1:
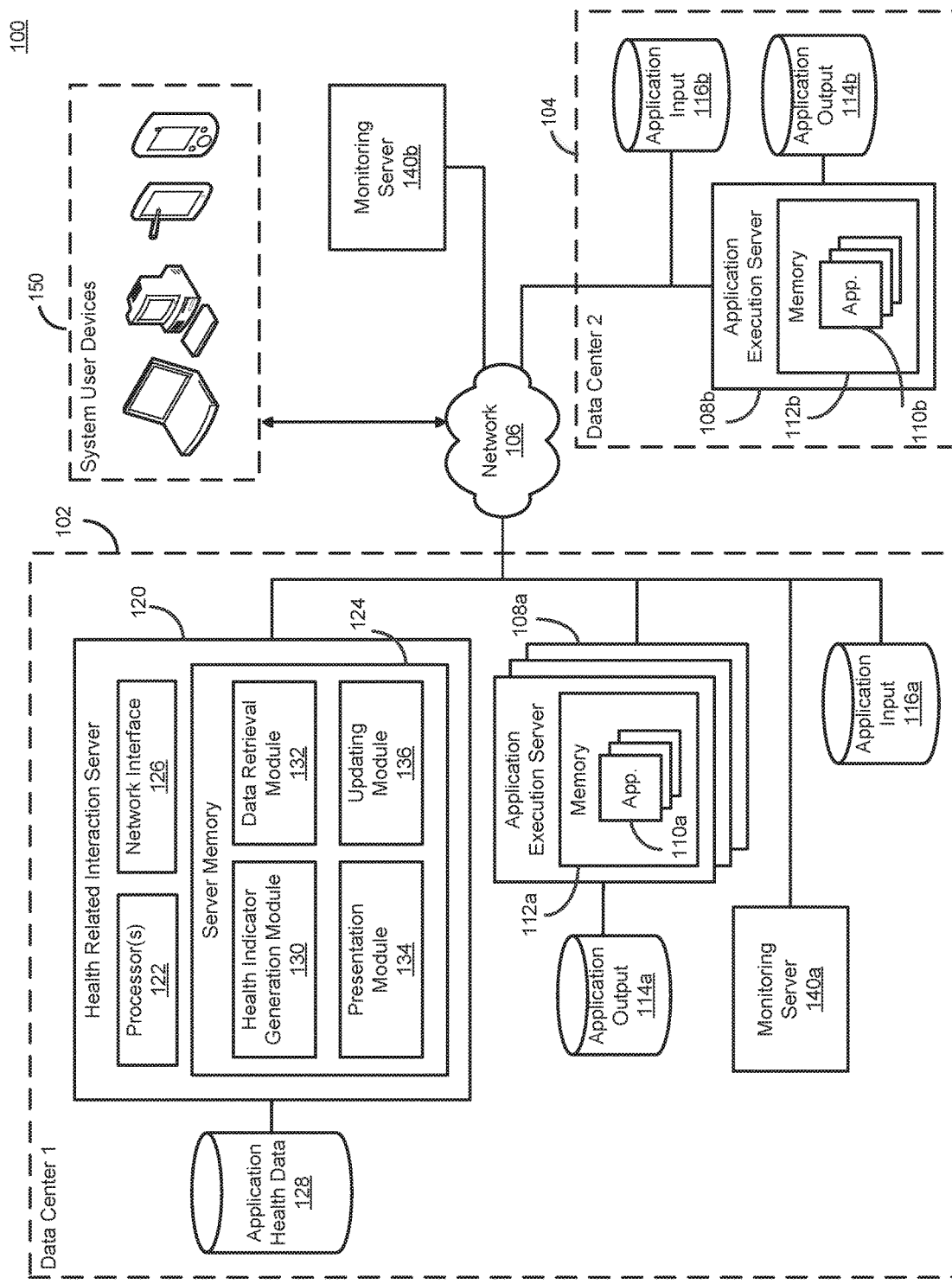
FIG. 1 is a simplified and exemplary block diagram of a computing environment which may assess and present information about the health of applications implemented in the computing environment.

The figures depict a preferred embodiment of the present invention for purposes of illustration only. One of ordinary skill in the art will readily recognize from the following discussion that alternative embodiments of the structures and methods illustrated herein may be employed without departing from the principles of the invention described herein.

DETAILED DESCRIPTION

The present embodiments relate to, inter alia, assessing and presenting information about the health of a plurality of applications, such as applications supporting web sites, applications producing business intelligence information, applications facilitating business collaboration or communication (e.g., email, customer relationship management, chat, etc. applications), etc. The information about the health of applications may include, by way of example, percentages of time applications are available to perform corresponding functions (or "availability") and average times taken by applications to perform corresponding functions (or "performance"). Further, the indications of health may include counts of events related to applications (e.g., executions, failures, errors, and exceptions) and rates corresponding to applications (e.g., throughputs of customers or transactions). The plurality of applications may be implemented in a computing environment including any number and type of servers, data storage devices, switches, firewalls, gateways, etc. disposed at one or multiple distinct geographic locations (e.g., "data centers").

Indications of health assessed and presented by the present embodiments may be comparable among the plurality of applications. That is, an indication of health for one of the applications may be directly compared to a similar indication of health for another one of the applications. In this manner, the indications of health may allow developers and administrators to quickly draw conclusions about the current health of applications implemented in the computing environment and about correlations between application behaviors and health, without having to interpret, manipulate, or view multiple dissimilar metrics from a plurality of tools.

In one aspect, the present embodiments may include a virtual "dashboard" that provides an integrated view of comparable indications of health for all applications implemented in a computing environment. As an example, a display screen and/or user interface may display one or more selectable visual elements, such as "tiles," corresponding to each of a plurality of applications. The one or more visual elements corresponding to each of the applications may present one or more indications of health. The indications of health may be represented, in the selectable visual elements, by an icon or text, and may be labeled with information about the application (e.g., a name), information about the development phase of the application (production, pre-production, etc.), information about portions of the computing environment where the application is implemented or is executing (e.g., a particular data center), etc. The display screen and/or user interface may also display one or more selectable visual elements presenting indications of overall or aggregated health for portions of the computing environment, such as particular data centers or modular portions of data center (e.g., server "pods").

In some aspects, upon a selection (e.g., a mouse click or tap on a touchscreen by a user) of one of the visual elements, the virtual dashboard may present more detailed or different information about the health of application or the health of the computing environment. As an example, a display screen and/or user interface may display a visual element corresponding to a particular application, which visual element may include an availability of the particular application represented by a percentage. Upon selection of the visual element, the display screen and/or user interface may display other health information corresponding to the particular application, such as graphs or plots of performance over time, failure counts, throughput rates, etc. Further, other input from users, such as input from keywords, selections from drop-down menus, selections of buttons, etc., may cause the virtual dashboard to display filtered versions of one or more visual elements.

With conventional techniques, developers or administrators may need to install a variety of tools, link a variety of tools to applications and/or other tools, view multiple interfaces, and decipher multiple dissimilar metrics to assess the health of applications in a computing environment. On the other hand, the present embodiments automatically aggregate comparable health information for a plurality of applications. The present embodiments may also allow developers and administrators to efficiently view, filter, and search for relevant health information for a single application, multiple applications implemented in a particular portion of the computing environment (e.g., a particular data center and/or server pod), and/or all applications implemented across all portions of a computing environment.

In one aspect, the information about the health of a plurality of applications, as discussed herein, may be presented on an optics dashboard or other virtual dashboard. The optics dashboard or associated functionality may retrieve data, through various web services, from multiple tools and aggregate that data in consistent frequencies to present views of trended data indicating ill health or healthy application and infrastructure behaviors. Additionally, the optics dashboard may report data using consistent measures and presentation across all applications included in its scope so that comparisons may be made properly from one application to another. Consistent presentation may facilitate better communicate among system users and coordinate problem identification quickly, which may lead to greater supportability.

Additionally, the optics dashboard may collect data from disparate sources and present that data in more consumable, consistent ways to improve the overall understanding of the applications and infrastructure. It may democratize access to application and infrastructure health data. The optics dashboard may present the data to any user in a consumable way without compromising security or requiring extensive training.

In one aspect, a computer-implemented method of presenting an overall health of a computing environment on a display may be provided. The method may include presenting health information for a plurality of applications running in the computing environment, the health information including a virtual depiction of a health of each application, the virtual depiction of the health for each application including (i) a graphical or textual representation of a first current status of the availability of the respective application, and (ii) a graphical or textual representation of a second current status of the performance of the respective application to facilitate an overall understanding of the health of the computing environment and/or identification of individual applications, or groupings of applications, running that are exhibiting poor behavior and may need refinement, adjustment, optimization, and/or cancellation. The availability may be depicted or expressed as a percentage, and the performance may be depicted or expressed as a speed or time-based performance.

I. Exemplary Computing Environment

FIG. 1 illustrates various aspects of an exemplary computing environment 100 which may implement a plurality of applications and which may implement methods for assessing and presenting information about the health of the plurality of applications. The high-level architecture may include both hardware and software applications, as well as various data communications channels for communicating data between the various hardware and software components. The system for assessing and presenting information about the health of the plurality of applications may include various software and hardware components or modules that may employ a method to gather data about application health, determine indications of health, generate visual elements, and/or send visual elements to user devices. The various modules may be implemented as computer-readable storage memories containing computer-readable instructions (i.e., software) for execution by a processor of the system for assessing and presenting information about the health of the plurality of applications.

The exemplary computing environment 100 shown in FIG. 1 may include additional, fewer, or alternate components, including those discussed elsewhere herein.

II. Exemplary Data Centers

The computing environment 100 may include one or more data centers 102 and 104 disposed at the same or different geographic locations. In some implementations, the data centers 102 may be communicatively connected via a network 106. The network 106 may include a local area network or other type of suitable network (e.g., the Internet, a metropolitan area network (MAN), a wide area network (WAN), a mobile, a wired or wireless network, a private network, a virtual private network, etc.). Although two data centers 102 and 104 are illustrated in FIG. 1, it is understood that computing environments implementing a plurality of applications may include any number of data centers at any number of locations and communicatively connected via any number of networks.

In some implementations, at least one data center of the computing environment, such as the data center 102 and/or 104, may be segmented into a number of subdivisions or portions. In an example, the data centers 102 and 104 may be assembled from one or more modular data center components, or "pods," each pod including servers, data storage devices, switches, gateways, etc. When implemented in the data centers 102 and 104, an application may execute on one or more processors and utilize data on one or more data storage devices that are spread across multiple pods. Alternatively, applications may be wholly implemented within a single pod or other modular data center component.

III. Exemplary Components Implementing Applications

Each or at least some of the data centers of the computing environment 100, such as the data centers 102 and 104, may include one or more servers 108a and 108b implementing a plurality of applications 110a and 110b. Specifically, the servers 108a and 108b may include one or more memories 112a and 112b adapted to store the plurality of applications 110a and 110b as non-transitory computer-readable instructions executable by one or more processors of the servers 108a and 108b. The one or more memories 112a and 112b may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

As mentioned above, the plurality of applications 110a and 110b may implement a variety of functions or operations. In an implementation, a company or organization, such as an insurance company, financial institution, etc., may operate the data centers 102 and 104, and the plurality of applications 110a and 110b may perform functions or operations allowing the company or organization to conduct business, interact with customers, complete transactions, etc. By way of example and without limitation, the plurality of application 110a and 110b may include email applications, customer relationship management applications, web payment applications, product or service quote/estimate generation applications, business intelligence applications, content management applications, project management applications, form/correspondence generation applications, information technology (IT) applications, etc. Generally, the plurality of applications 110a and 110b may perform any suitable functions related to the operation of a company or organization, such as producing content for customers/clients of a company or organization, facilitating interactions with customers/clients of a company or organization, facilitating interactions amongst employees of a company or organization, generating content for employees of a company or organizations, or completing backend processes of the computing environment 100.

When executed by the servers 108a and 108b, the plurality of applications 110a and 110b may generate output, such as log files, error files, output data, etc., that is stored in one or more application output data storage devices 114a and 114b. The plurality of applications 110a and 110b may also utilize input, such as configuration files, input data, etc., stored in one or more application input data storage devices 116a and 116b. Byway of example, the application output data storage devices 114a and 114b and the application input data storage devices 116a and 116b may include hard disk drives (HDDs), flash memories, solid state drives (SSDs), etc.

IV. Exemplary Components Assessing the Health of Applications

One or both of the data centers 102 and 104 may include various components configured to assess and present information about the health of the plurality of applications 110a and 110b. In an implementation, the data center 102 may include a health-related interaction server 120 adapted to gather data about application health, determine indications of health, generate visual elements, and/or send visual elements to user devices. In particular, the health-related interaction server 120 may include one or more processors 122 (or microprocessors), a server memory 124, and a network interface 126, all of which may be interconnected via an address/data bus (not shown).

The server memory 124 may store computer-executable instructions, which may be executed by the processors 122. In some embodiments, the health-related interaction server 120 may also include, or otherwise be communicatively connected to, an application health database 128 or other data storage mechanism (e.g., one or more hard disk drives, optical storage drives, solid state storage devices, etc.). The server memory 124 of the health-related interaction server 120 may include multiple server memories storing one or more corresponding application modules 130, 132, 134, and 136, according to a particular configuration of the health-related interaction server 120. The server memory 124 may be implemented in a known form of computer storage media, including but not limited to, semiconductor memories, magnetically readable memories, and/or optically readable memories, for example, but does not include transitory media such as carrier waves.

V. Exemplary Monitoring Components

To assess and present information about the health of the plurality of applications 110a and 110b, the health-related interaction server 120 may gather data about the health of the plurality of applications 110a and 110b from one or more monitoring servers 140a and 140b (e.g., via the data retrieval module 132). Although two monitoring server 140a and 140b are illustrated in FIG. 1, computing environments may include any number of monitoring servers.

Some monitoring server communicatively connected to the health-related interaction server 120 may be disposed in the same data center as the health-related interaction server 120, such as the monitoring server 140a, while other monitoring servers may be communicatively connected to the health-related interaction server 120 via the network 106. In fact, some monitoring servers, such as the monitoring server 140b, may not be disposed in any data center of a company or organization operating the health-related interaction server 120, in an implementation. That is, monitoring server, such as the monitoring server 140b, may be operated by a third party having an agreement or contract with a company or organization to monitor the plurality of applications 110a and 110b.

The monitoring servers 140a and 140b may implement any number of hardware and/or software components to monitor the health of the plurality of applications 110a and 110b in any number of ways. By way of example, the monitoring servers 140a and 140b may implement hardware and/or software components to analyze log files generated by the plurality of applications 110a and 110b and stored in the application output 114a and 114b, simulate customer "journeys" through web pages of a company or organization, track transactions facilitated by one or more of the plurality of applications 110a and 110b, count errors or failures of executing ones of the plurality of applications 110a and 110b, index and search output of the plurality of applications 110a and 110b, time certain operations of the plurality of applications 110a and 110b, measure failure or throughput rates, etc.

VI. Exemplary System User Devices

The health-related interaction server 120 may transmit visual elements presenting health information (e.g., corresponding to the plurality of applications 110a and 110b) to and otherwise interact with a plurality of system user devices 150 via the network 106. The system user devices 150 may include, by way of example, a personal computer, smart phone, tablet computer, or other suitable computing device. Those skilled in the art will recognize that the present techniques may be utilized in a dedicated application, a web browser, a combination thereof, etc. executing on the system user devices 150. The computing environment 100 may include additional, fewer, or alternate components, including those discussed elsewhere herein.

VII. Exemplary Virtual Dashboard and Related Functionality

FIG. 2 illustrates an exemplary "dashboard" 200 that may include a plurality of visual elements 202 presenting health information about a plurality of applications. One or more of the system user devices 150 may display the dashboard 200 in a web browser application receiving content (web pages, images, etc.) from the health-related interaction server 120, for example.

The exemplary dashboard 200 may include a variety of sections, or "tiles" 202, where each of the tiles 202 corresponds to one of the applications 110a and 110b implemented in the computing environment 100. For example, a tile 204a may correspond to a first one of the applications 110a and 110b ("Application 1"), a tile 204b may correspond to a second one of the applications 110a and 110b ("Application 2"), etc. In the implementation depicted in FIG. 2, each of the tiles 202 may display one or more indications of health corresponding to the respective application. In this manner, a user viewing the dashboard 200 may simultaneously view and compare indications of health for many of the applications 110a and 110b.

Indications of health may include any suitable metrics representing the health of the applications 110a and 110b and defined substantially the same for each of the applications 110a and 110b, in an implementation. By defining and calculating the indications of health substantially the same for each of the applications 110a and 110b, indications of health displayed in the dashboard 200 may be directly comparable.

Specifically one of the example tiles 202, tile 204a, may include a percentage 206a of time "Application 1" is available to perform corresponding functions and a length of time 208a taken by "Application 1" to perform corresponding functions. In a scenario in which "Application 1" is an application completing online purchases for customers of a company, the percentage 206a may represent a percentage of time "Application 1" is available to complete purchases during the last day, week, month, etc. On the other hand, the length of time 208a may represent an average time taken by "Application 1" to complete a customer purchase over the last day, week, month, etc.

The monitoring servers 140a and 140b may generate the indications of health presented in the tiles 202, such as the percentage 206a and the length of time 208a, and the health-related interaction server 120 may gather the indications of health directly from the monitoring server 140a and 140b. Alternatively, the health-related interaction server 120 may manipulate data retrieved from the monitoring servers 140a and 140b to generate the indications of health. For example, each of the monitoring server 140a and 140b may generate dissimilar indications of health for at least some of the applications 110a and 110b, and the health-related interaction server 120 may execute one or more modules, such as the health indicator generation module 130, to transform the dissimilar indication of health into comparable indications of health.

In one scenario, the monitoring server 140a may generate a first percentage representing an availability of "Application 1," where the first percentage corresponds to the availability of "Application 1" over the past twenty-four hours. In contrast, the monitoring server 140b may generate a second percentage representing an availability of "Application 2," where the second percentage corresponds to the availability of "Application 2" over the past four hours. Due to the differences in these metrics, the health-related interaction server 120 may transform (e.g., by normalization) the first percentage into a new percentage representing an availability of "Application 1" over the past four hours. The health-related interaction server 120 may generate the tiles 204a and 204b including the new percentage for "Application 1" as the percentage 206a and the second percentage for "Application 2" as a percentage 206b, such that the percentage 206a and the percentage 206b are directly comparable.

Generally, the health indicator generation module 130 of the health-related interaction server 120 may perform any number and type of transformation or manipulations of retrieved data from the monitoring server 140a and 140b, such that indications of health display in dashboards, such as the dashboard 200, are comparable. For example, the health indicator generator module 130 may normalize, add, subtract, divide, multiply, etc. values of metrics generated by the monitoring servers 140a and 140b and/or analyze data, such as log files, generated by the monitoring servers 140a and 140b to generate new indications of health.

The dashboard 200 may further include one or more indications of overall (or "aggregated") health 220 corresponding to portions of the computing environment 100 or multiple of the applications 110a and 110b corresponding to a certain type. In a case in which the indication of overall health 220 corresponds to a portion of the computing environment, the indication of overall health 220 may represent a health of the entire computing environment 100 (or at least all data centers 102 and 104 operated by a company), a subset of data centers, certain pods of data centers, or any other suitable portion of a computing environment, which portion implemented more than one of the applications 110a and 110b.

In the case in which the indication of overall health 220 corresponds to multiple applications 220, the indication of overall health 220 may represent the health of ones of the applications 110a and 110b that are grouped according to a development stage (production, pre-production, etc.), application type (customer-facing, backend, etc.), corresponding divisions of a company (customer support, information technology, etc.), and/or any other grouping of the applications 110a and 110b producing groups of multiple of the applications 110a and 110b. The health indicator generation module 130 may generate the indication of overall health 220 by combining (e.g., via an average or weighted average) indications of health for corresponding ones of the applications 110a and 110b. The dashboard 200 may include additional, fewer, or alternate components, including those discussed elsewhere herein.

VIII. Exemplary Virtual Dashboard Tiles

Figure 3A:
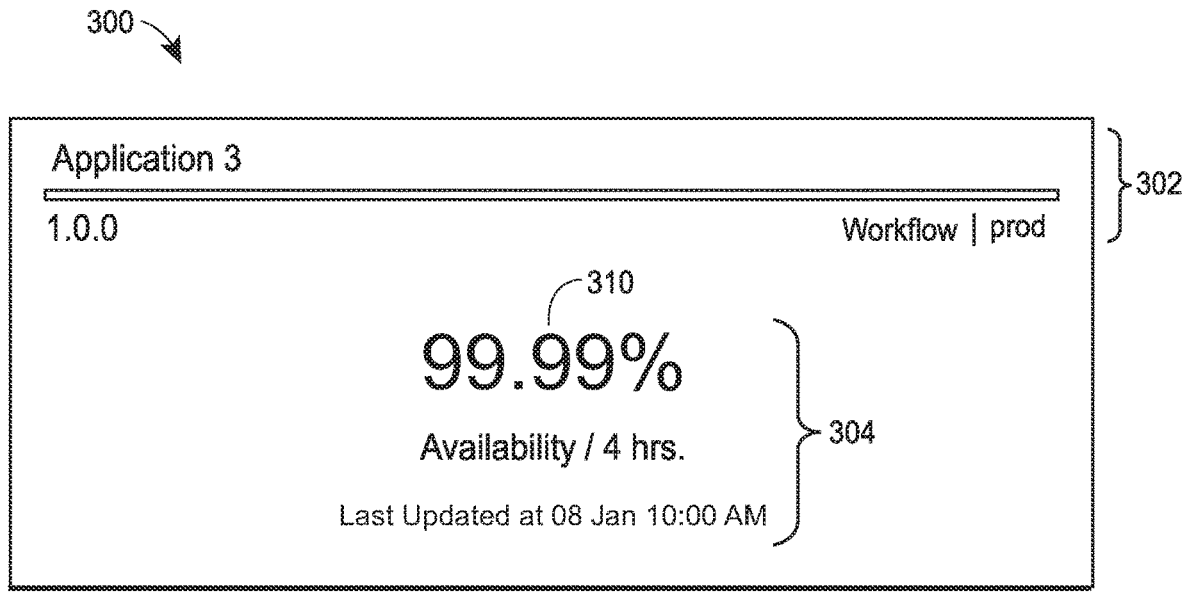
FIGS. 3A and 3B illustrate exemplary visual elements that may be included in a virtual dashboard.
Figure 3B:
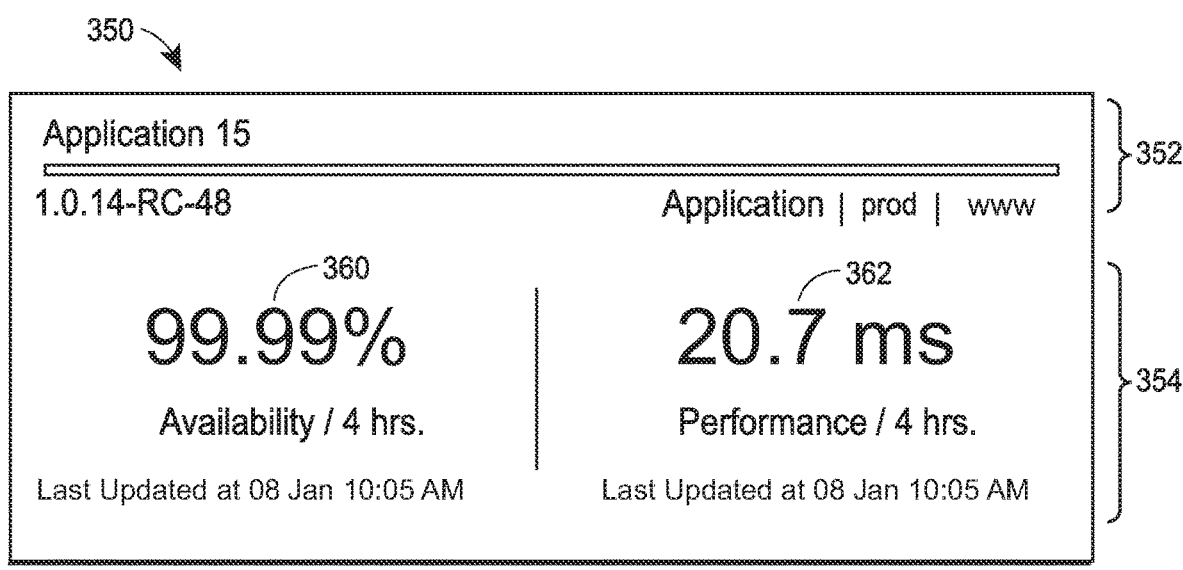

FIGS. 3A and 3B illustrate two exemplary tiles 300 and 350 of a virtual dashboard, which tiles 300 and 350 present indications of health for corresponding applications. The dashboard 200 may include the tiles 300 and 350 and the health-related interaction server 120 may generate content for the tiles 300 and 350 (e.g., with the presentation module 134), for example.

The exemplary tile 300 may include a header section 302 and an indicator section 304. The header section 302 may include a plurality of information about the application to which the tile 300 corresponds, such as a name, version, identification of a data center implementing the application, development stage, type of application, division or department of a company that operates the application, etc. The indicator section 304 of the exemplary tile 300 may include a percentage 310 (or "indication of health") representing an availability of the application to which the tile 300 corresponds. The indicator section 304 also may include information about the percentage 310 itself, such as a time period over which the percentage 310 represents availability and/or a time at which the percentage 310 was last updated.

The exemplary tile 350 may also include a header section 352, similar to the header section 302, and/or an indicator section 354. The indicator section 354 of the tile 350 may include multiple indications of health, including a percentage 360 representing an availability and a length of time 362 representing a performance of a corresponding application. Generally, tiles or other visual elements utilized to display (e.g., in a dashboard) health information to a user may include any number of indications of health. However, in some implementations, the health-related interaction server 120 may generate certain indications of health, such as percentages representing availabilities and lengths of time representing performances, to be displayed (e.g., within tiles such as tiles 300 and 305) on a main or default page of a virtual dashboard, and other indications of health to be displayed only upon certain user interactions, as discussed further with reference to FIGS. 7A, 7B, 8, and 9.

Some indications of health may not be relevant to certain types of applications, and, thus, may not be displayed in corresponding tiles or visual elements, in some implementations. For example, the tile 300 may correspond to a "workflow" facilitated by "Application 3," where the workflow corresponds to a collection of web pages that users navigate to complete a function (e.g., make a purchase, get an insurance quote, etc.). As such, a relevant indication of health for "Application 3" may include the percentage 310, not a length of time representing a performance. That is, "Application 3" should be close to constantly available such that customers may navigate the web pages and complete the function, but administrators or developers may not be concerned with how fast customers choose to navigate the web pages.

On the other hand, the tile 350 may correspond to an application or a service provided by an "Application 15" that may include generating certain content (insurance quotes, product or service estimates, correspondence, etc.), performing certain calculations (e.g., to generate business intelligence information), etc. In this case, the tile 350 may include both the percentage 360 and the length of time 362, because developers or administrators may be concerned with both an availability of "Application 15" and a performance, or time to complete certain functions, of "Application 15."

Although FIGS. 3A and 3B illustrate visual elements that include different numbers of indications of health for different types of applications, virtual dashboards or other displays related to the health of applications may present the same number of indications of health for all applications. Also, in some implementations visual elements may include any number of indications of health different than those depicted in FIGS. 3A and 3B, such as three, four, etc. indications of health. The tiles 300, 350 may include additional, less, or alternate components, including those discussed elsewhere herein.

Figure 4:
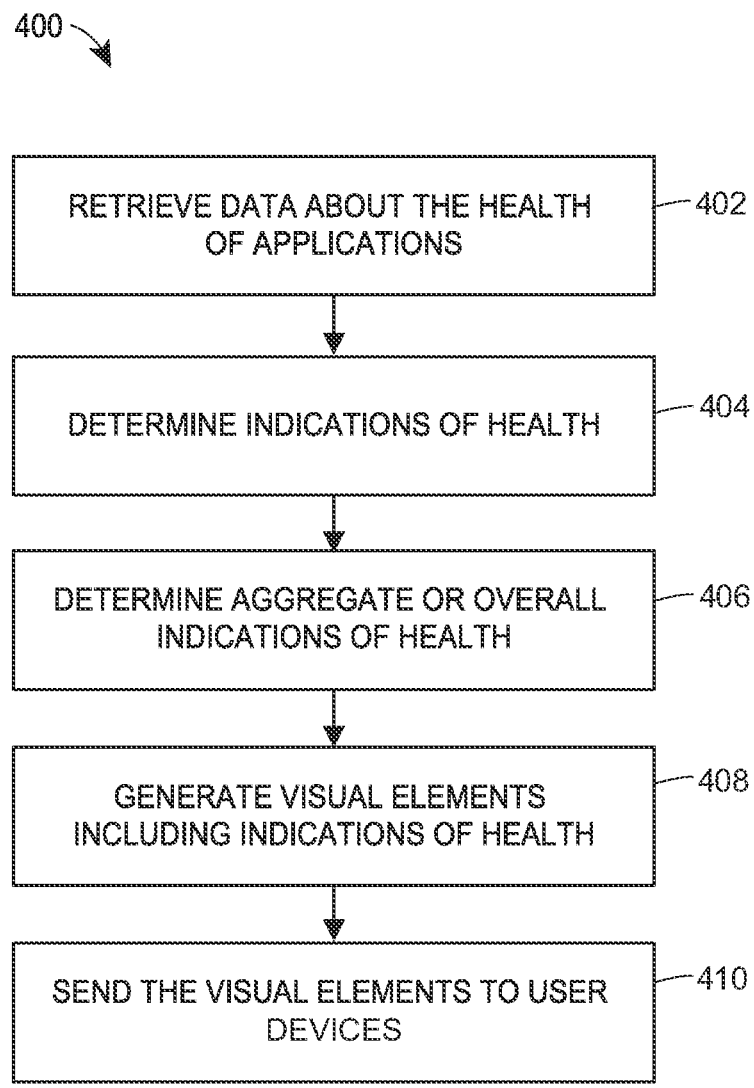
FIG. 4 is a flow chart illustrating an exemplary method for assessing and presenting information about the health of applications.

IX. Exemplary Method for Assessing and Presenting Information about the Health of Applications FIG. 4 is a high level flow chart of an exemplary method 400, or routine or process, for assessing and presenting information about the health of applications implemented in a computing environment. The health-related interaction server 120 may implement the method 400, for example.

Data about the health of applications implemented in a computing environment may be retrieved (block 402). The health-related interaction server 120, for example, may retrieve data about the health of the applications 110a and 110b from the monitoring servers 140a and 140b. In some cases, the data about the health of the applications 110a and 110b may include indications of health, such as percentages, lengths of time, counts, etc., that the health-related interaction server 120 will directly integrate into visual elements for display or transform into other indications of health to be integrated into visual elements for display.

In other cases, the data about the health of the applications 110a and 110b may include files, data, or other information that may be analyzed by the health-related interaction server 120 to generate indications of health. For example, the data about the health of the applications 110a and 110b may include log files (indicating failures, errors, etc.) of instances of the applications 110a and 110b, data files including a plurality of measurements (e.g., CPU or memory usage), configuration files of the applications 110a and 110b, indications of simulated or actual customer interactions with the applications 110a and 110b or with content generated by the applications 110a and 110b, etc.

The health-related interaction server 120 may retrieve the data about the applications at any suitable periodic or pre-determined times, in an implementation. For example, the health-related interaction server 120 may retrieve the data about the applications every four hours, eight hours, twenty-four hours, week, etc., when prompted by developers or administrators, or at certain pre-defined times during a day, week, etc. (e.g., morning and evening). In other implementations, the monitoring server 140a and 140b may transmit data about applications to the health-related interaction server 120 periodically or at certain pre-defined times, and the health-related interaction server 120 may utilize, store, and/or generate indications of health from the data about applications at the same or different times.

Indications of health are determined based upon the retrieved data about the health of applications (block 404). As mentioned above, the health-related interaction server 120 may directly retrieve indications of health from the monitoring servers 140a and 140b, and/or the health-related interaction server 120 may transform indications of health from the monitoring server 140a and 140b and/or analyze the data about the health of application to generate indications of health (e.g., via the health indicator generation module 130). By way of example, the health-related interaction server 120 may parse files, convert data or file formats, compare data with models of application health, search log files for certain values or information, and/or perform any other suitable transformations, manipulations, mathematical operations, etc. to derive indications of the health of the applications 110a and 110b from the retrieved data about the health of applications.

The health-related interaction server 120 of some embodiments may also determine indications of health at least partially based upon data generated directly by corresponding applications or data input to the corresponding applications. For example, the health-related interaction server 120 may analyze log files, output files or data, error files, configuration files, etc. stored in the application input 116a and 116b and/or stored in the application output 114a and 114b to generate indications of health. In fact, in some implementations, the health-related interaction server may generate all indications of health or at least some indications of health based entirely upon data stored in the application input 116a and 116b and/or stored in the application output 114a and 114b without a need for data generated by the monitoring servers 140a and 140b.

Returning to FIG. 4, indications of overall health of portions of a computing environment and/or types of applications may be determined (block 406). As an example, the health-related interaction server 120 may generate an indication of overall health for the data center 102 based upon a mathematical combination or other manipulation of indications of health for the applications 110a implemented in the data center 102. In one implementation, the health-related interaction server 120 may generate indications of overall health for data centers, modular portions of data centers, and/or groups of applications of a certain type (customer facing, web application, IT, etc.) by computing an average or weighted average of indications of health for applications corresponding to the data centers, modular portions of data centers, and/or groups of applications of a certain type. However, generally, indications of aggregate or overall health may be generated using any suitable representation of health, such as identifications of best performing or worst performing applications, statistical measures of the health of corresponding applications (e.g., standard deviations of availability or performance or median values of certain indications of health), costs associated with operating applications or portions of a computing environment, etc.

Visual elements presenting the determined indications of health and/or indications of overall or aggregate health are generated (block 408). As further described with reference to FIGS. 2, 3A, and 3B, these visual elements may include "tiles" of information that are to be presented in a virtual dashboard, where the virtual dashboard may be accessed by a user of one of the system user devices 150 via a web browser. However, any visual elements, such as tables, graphs, plots, documents, electronic correspondence (e.g., emails), mobile alerts (e.g., PUSH alerts), etc., may be generated to present indications of health and/or indications of overall or aggregate health. By way of example, the visual elements may include text, numbers, icons, colors, textures, and/or animations presenting indications of health and/or indications of overall or aggregate health, as further illustrated in FIG. 2.

The generated visual elements may then be communicated to user devices, such as the system user devices 150, for display (410). The visual elements may be communicated via any suitable combination of standard or proprietary communication protocols, such as the Hypertext Transfer Protocol (HTTP). For example, upon receiving an HTTP GET request, generated by a web browser application executing on one of the system user devices 150, the health-related interaction server 120 and/or another web server communicatively connected to the health-related interaction server 120 may transmit visual elements to the one of the system user devices 150 via an HTTP 200 message and/or other HTTP messages. In some implementations, the health-related interaction server 120 may also embed the generated visual elements in documents (e.g., Portable Document Format (PDF) documents) or pieces of correspondence (e.g., email) that are sent to the system user devices 150 (e.g., via the Simple Mail Transfer Protocol (SMTP) or other suitable communication protocol). The method 400 may include additional, fewer, or alternate actions, including those discussed elsewhere herein.

X. Exemplary Navigation/Filtering Functionalities

Figure 5A:
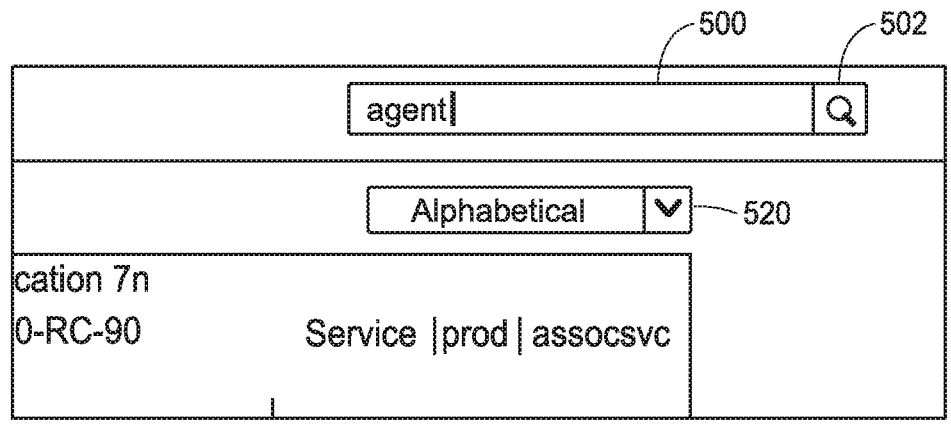
FIGS. 5A, 5B, and 5C illustrate exemplary navigational and filtering elements of a virtual dashboard.
Figure 5B:
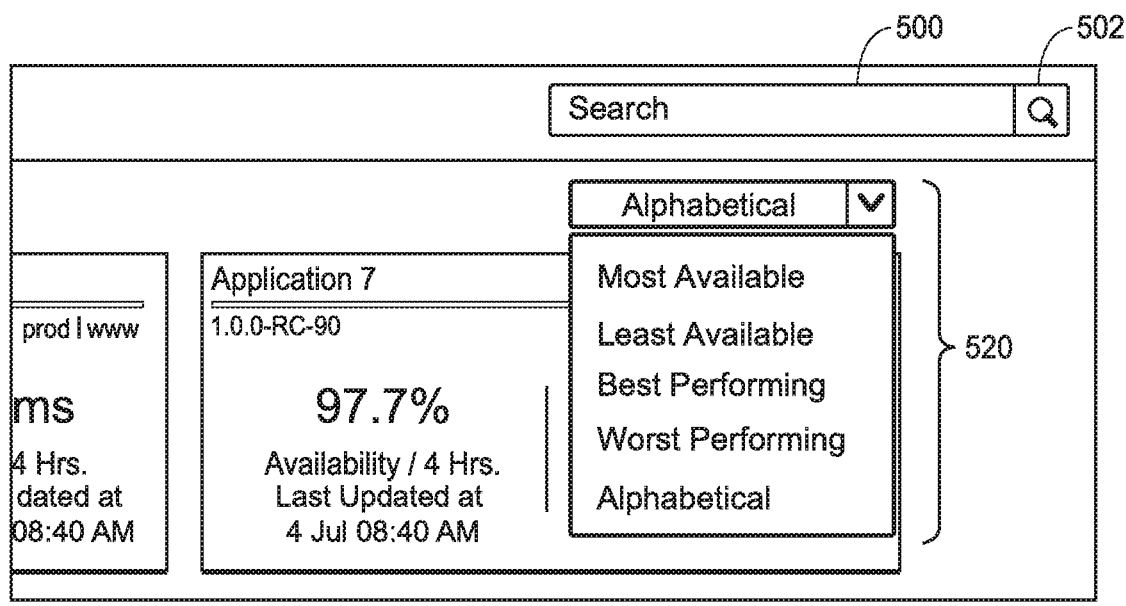
Figure 5C:
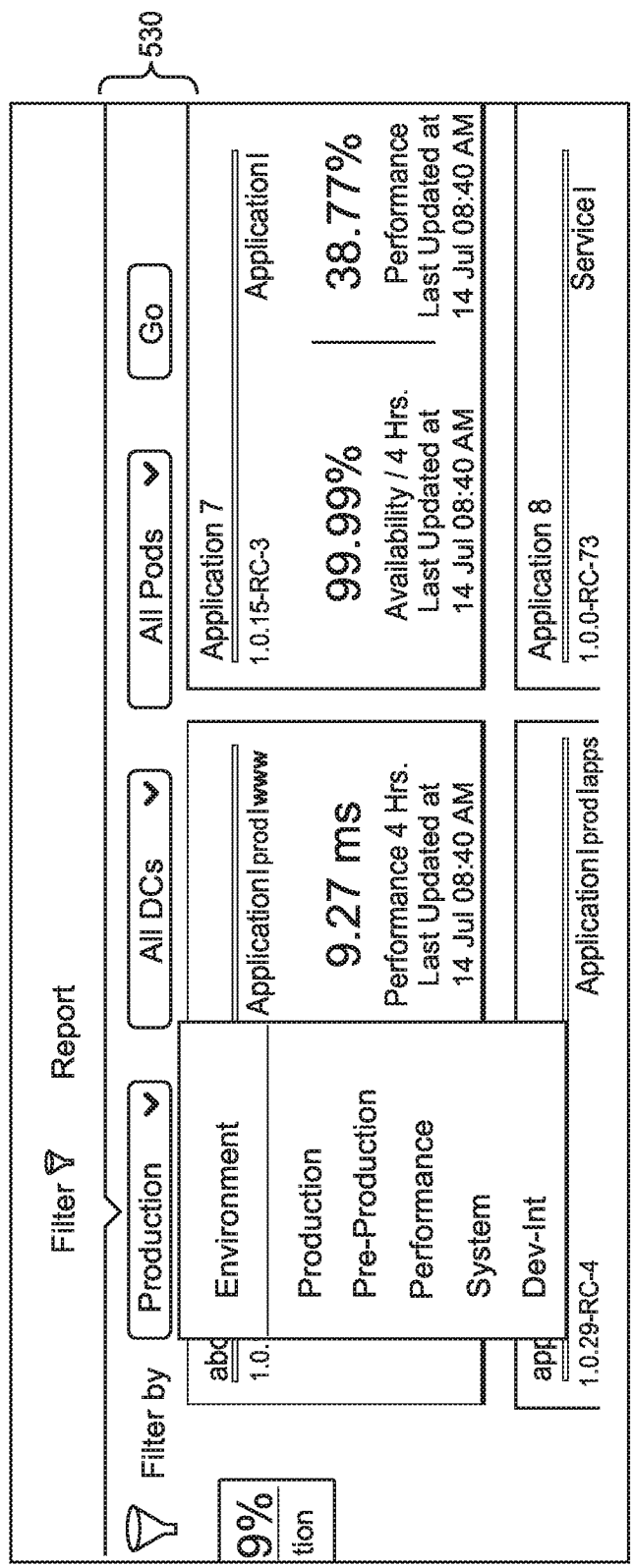

Some implementations of virtual dashboards, or other displays presenting indications of health, may include a variety of navigation and filtering functionalities allowing users to quickly view information about or assess the health of certain applications or portions of a computing environment. FIGS. 5A, 5B, and 5C depict exemplary features of a virtual dashboard, such as the dashboard 200, allowing users to navigate and/or filter information.

In particular, FIG. 5A depicts a virtual dashboard with a search box 500. A user of one of the system user devices 150 may enter (e.g., with a physical or virtual keyboard) one or more keywords into the search box 500. When the user selects a search button 502, a web browser executing on the one of the system user devices 150 may send the entered keywords to the health-related interaction server 120. Subsequently, the health-related interaction server 120 may filter indications of health and/or visual elements to identify a subset of visual elements that match the entered keywords. For example, the keywords may include part or all of an application name or data center name/identification. In such a case, the health-related interaction server 120 may identify the subset of visual elements presenting information about only the matching application or data center. The health-related interaction server 120 may then cause a "filtered" version of the virtual dashboard to be displayed on the one of the system user devices 150 including only the subset of visual elements.

Alternatively or additionally, displays presenting indications of health may include other interfaces or interactive elements allowing users to navigate or filter content. FIG. 5B illustrates an expanded drop-down menu 520. Using the drop-down menu 520, a user may select (e.g., with a click or tap) one of a pre-defined set of ways to sort the visual elements displayed in a virtual dashboard. In one implementation, these sorting methods may include "Most Available," "Least Available," "Best Performing," "Worst Performing," and "Alphabetical." For example, in one scenario, a user may select "Best Performing." In this scenario, the health-related interaction server 120 may cause a sorted version of the virtual dashboard to be displayed including visual elements sorted by the performance metrics presented within the visual elements. Generally, drop-down or other menus may include any number and type of sorting methods, such as update time, recently added, etc.

FIG. 5C illustrates still further drop-down menus 530 that may allow a user to filter visual elements of a virtual dashboard or other display. In particular, the exemplary drop-down menus 530 may allow a user to filter visual elements by a development or deployment stage or environment of corresponding applications (e.g., production or pre-production), data centers of a computing environment, and/or modular components (or "pods") of data centers. In one scenario, a user may select "Production" from the drop-down menus 530 to display only visual elements corresponding to applications deployed as "Production" applications (e.g., currently being utilized in everyday operations of a business). Further, a user may select multiple different items from multiple of the drop-down menus 530 to efficiently "drill down" to particular visual elements. For example, a user may select "Production" from a first, "DC1" from a second, and "Pod 5" from a third one of the drop-down menus 530 to only view production applications implemented in a fifth modular component of a first data center. The virtual dashboard may include additional, fewer, or alternate features, including those discussed elsewhere herein.

XI. Exemplary Method for Navigation/Filtering of Visual Elements

Figure 6:
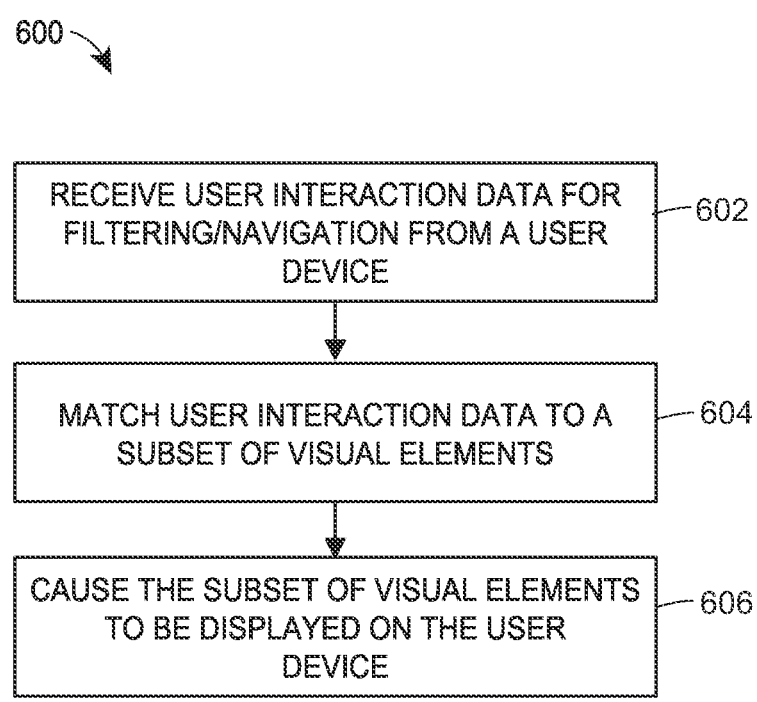
FIG. 6 is a flow chart illustrating an exemplary method for filtering, sorting, or allowing a user to navigate visual elements of a virtual dashboard.

FIG. 6 is a high level flow chart of an exemplary method 600, or routine or process, for filtering, sorting, and/or providing navigation functionality for visual elements presenting indications of health. The health-related interaction server 120 (e.g., the presentation module 134) may implement the method 600, for example.

User interaction data, such as keywords, menu selections, button selections, etc., may be received (block 602). As discussed further with reference to FIGS. 5A, 5B, and 5C a user accessing a virtual dashboard via a web browser may select or enter certain data, which data may be subsequently transmitted to the health-related interaction server 120. The user interaction data may then be matched with one or more visual elements presenting information about the health of applications in a computing environment (block 604). Such matching may include, among other things, matching keywords with application or computing environment component names, matching keywords with application functionality or descriptions, sorting visual elements based upon indications of health, identifying groups of visual elements presenting indications of health above or below a threshold value, etc.

Once matched, a subset of matching visual elements may then be transmitted to a user device for display, or otherwise identified as a subset of visual elements to be displayed (block 606). The method may include additional, fewer, or alternate actions, including those discussed elsewhere herein.

XII. Exemplary Detailed Health Information

In some implementations, virtual dashboards indicating health information about applications implemented in a computing environment may include one or more selectable visual elements. In particular, these selectable visual elements may allow a user to, upon selecting one of the elements, view more detailed health information about an application or a portion of a computing environment.

Figure 7A:
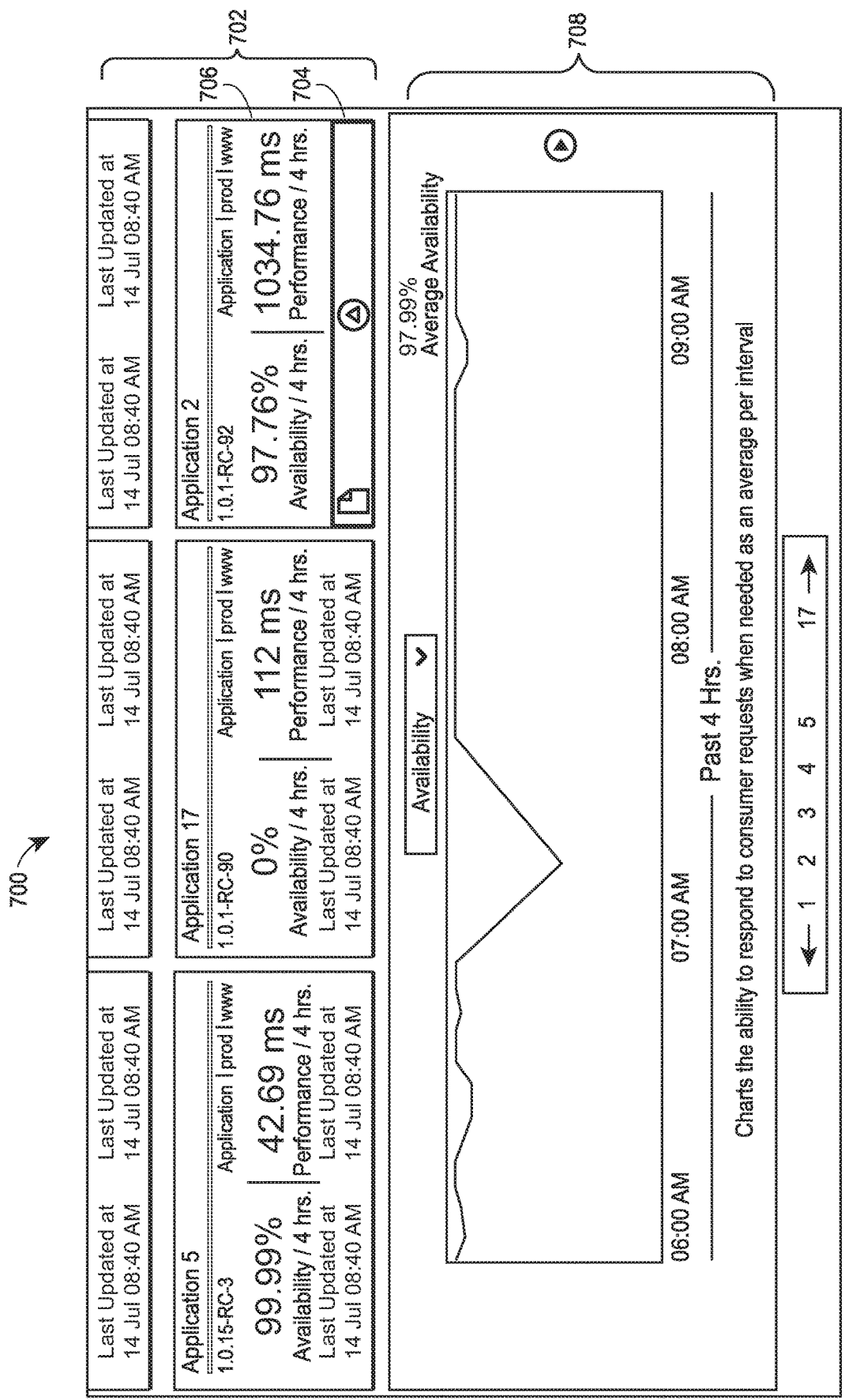
FIGS. 7A and 7B illustrate an exemplary detailed health information box.
Figure 7B:
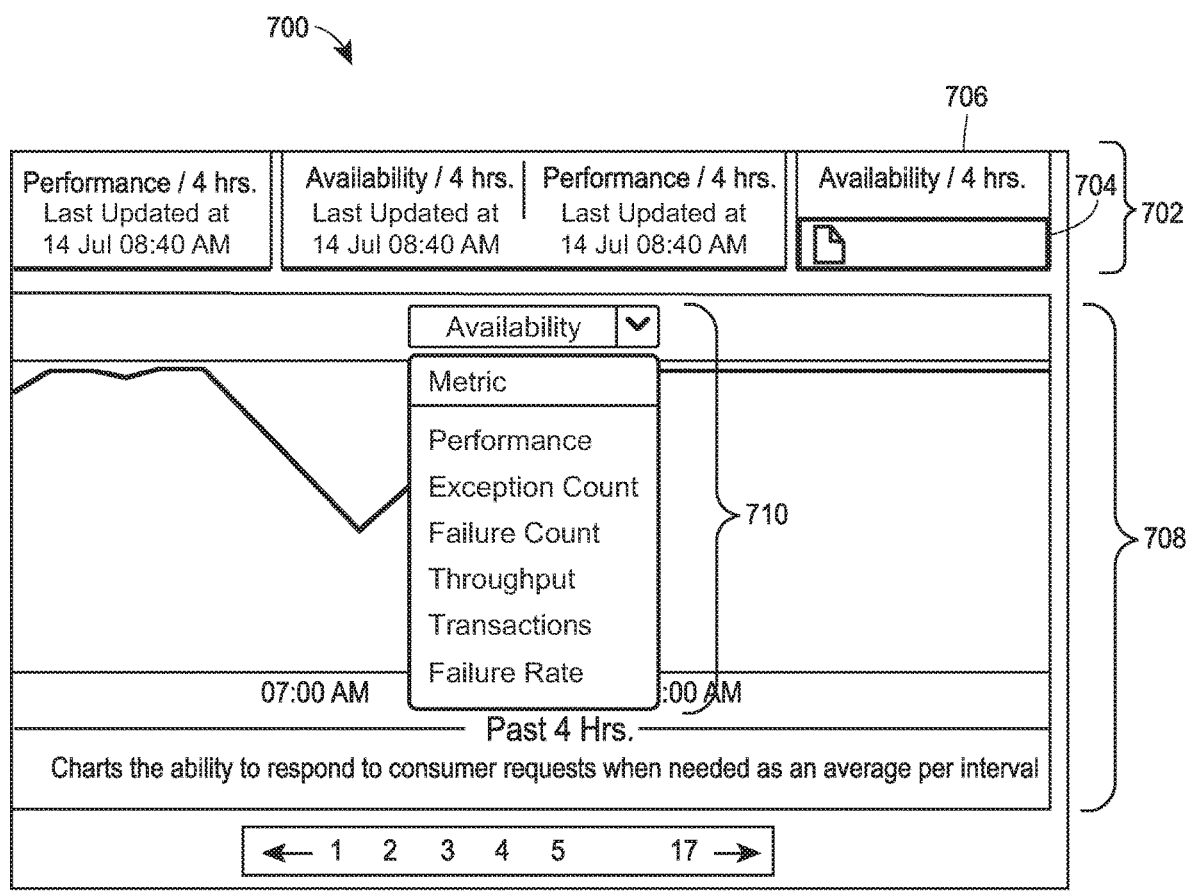

FIGS. 7A and 7B illustrate a portion of a virtual dashboard 700 including a plurality of visual elements, or "tiles" 702, where each of the tiles 702 corresponds to a particular application implemented in a computing environment. Each of the exemplary tiles 702 may include one or more indications of health corresponding to the respective application. Further, a portion of each of the tiles 702 may be selectable, such as the selectable portion 704 of the tile 706.

A user may select the selectable portion 704 (e.g., via a click or tap), and, in such a case, the health-related interaction server 120 may present a detailed health information box 708 along with or overlaying the tiles 702. The information presented in the detailed health information box 708 may correspond to the same application ("Application 2") of tile 706. However, the detailed health information box 708 may include more detailed and/or different information about the health of "Application 2."

In some implementations, detailed health information boxes, such as the detailed health information box 708, may include similar types of indications of health as those indicated in tiles, such as the tile 706, presented in manners different than in the tiles. For example, the detailed health information box 708 and the tile 706 may present an indication of the availability of "Application 2," where the detailed health information box 708 presents the availability information as a graph or plot over a certain time period and the tile 706 presents the availability information as a percentage over the same or different time period.

In other implementations, detailed health information boxes, such as the detailed health information box 708, may include different types of indications of health as those indicated in tiles, such as the tile 706. As illustrated by way of example in FIG. 7B, a user may optionally select (via a drop-down menu 710) to display indications of exception counts, failure counts, throughput rates, transaction counts or rates, failure rates, etc. over a time period (e.g., as a graph/plot or as numerical or textual values) within the detailed health information box 708. Such counts, rates, etc. may not be displayed within the tile 706, in the implementation.

Figure 8:
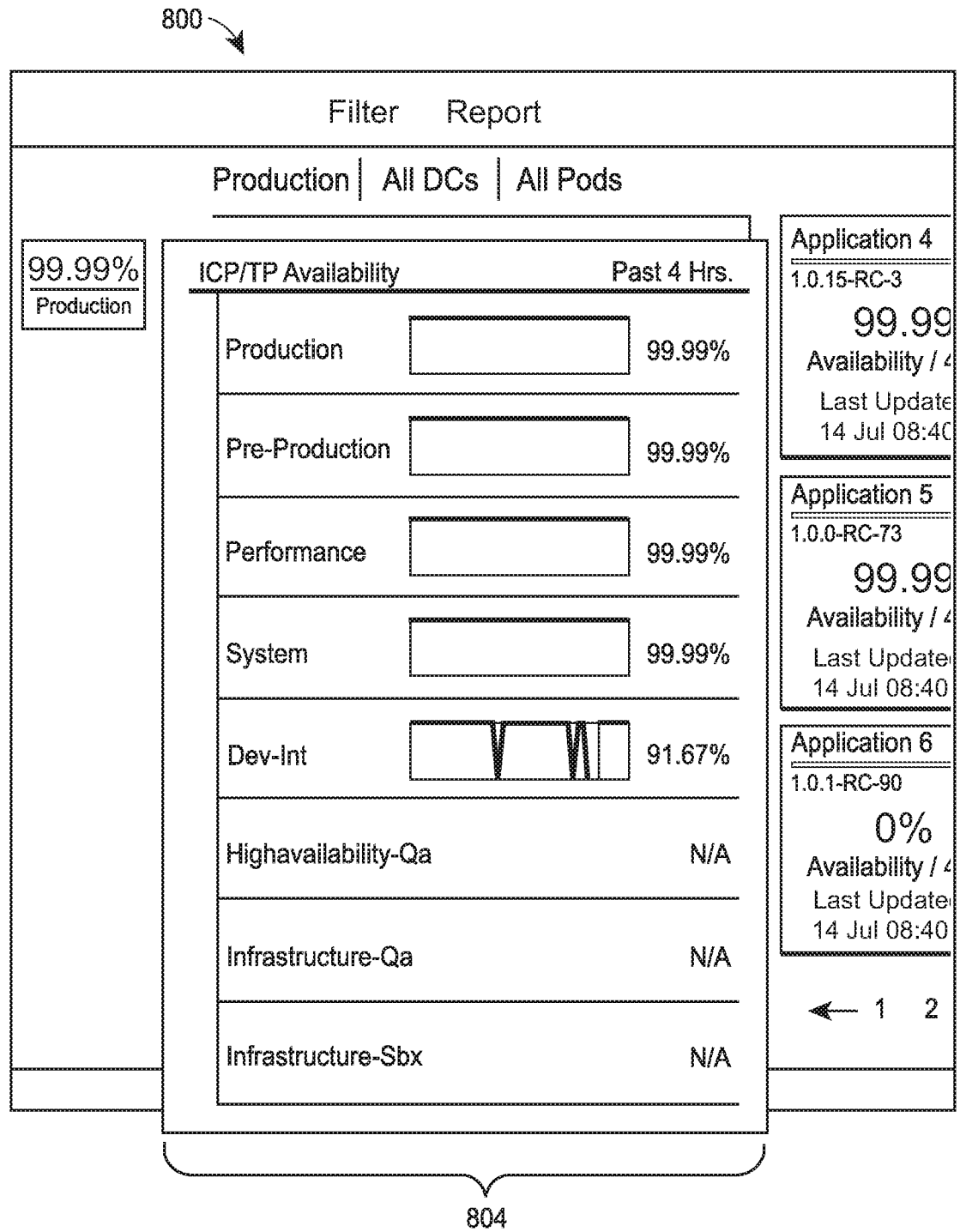
FIG. 8 illustrates another exemplary detailed health information box.

FIG. 8 illustrates an additional selectable visual element, an indication of overall health 800, displayed within a virtual dashboard 802. The exemplary indication of overall health 800 may represent the health of a portion of the computing environment implementing "Production" applications. When selected by a user, the indication of overall health 800 may expand to display a detailed health information box 804. In the exemplary implementation illustrated in FIG. 8, the detailed health information box 804 may display indications of health for portions of the computing environment implementing "Production" applications along with indications of health for portions of the computing environment implementing other types or categories of applications (e.g., pre-production applications). Generally, indications of overall health may be selectable so as to display the same and/or different types of indications of health for the same and/or different portions of a computing environment. The virtual dashboards 700, 802 may include additional, less, or alternate functionality, including that discussed elsewhere herein.

XIII. Exemplary Method for Displaying Detailed Health Information

Figure 9:
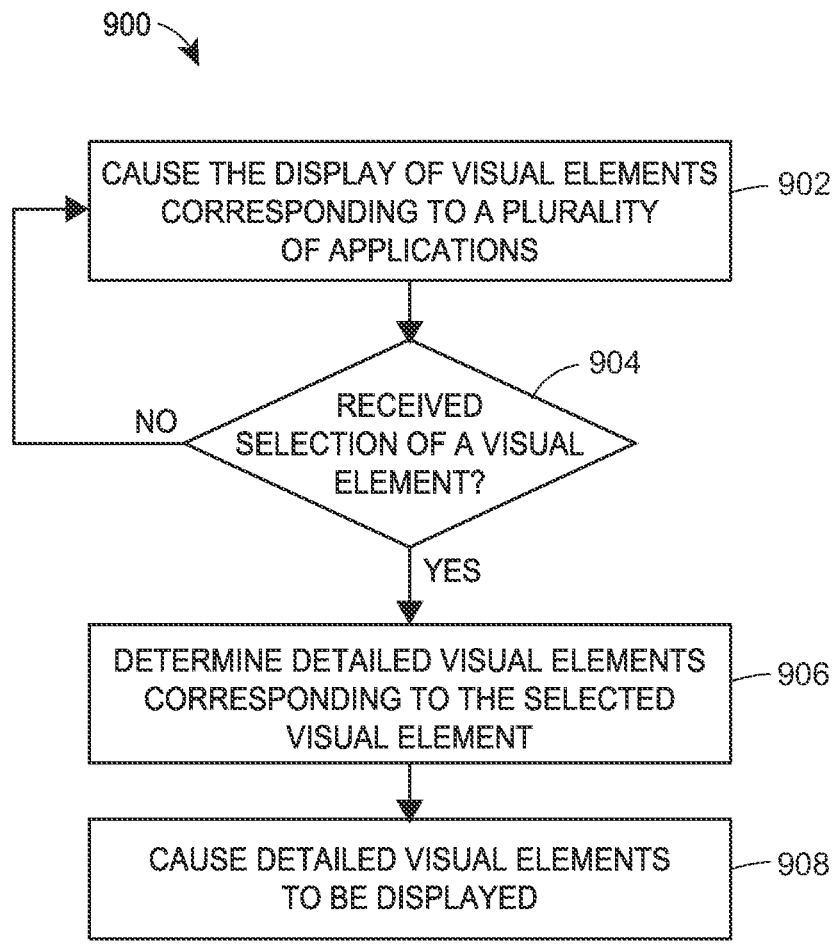
FIG. 9 is a flow chart illustrating an exemplary method for displaying more detailed or different indications of health upon the selection of a visual element.

FIG. 9 is a high level flow chart of an exemplary method 900, or routine or process, for filtering, sorting, and/or providing navigation functionality for visual elements presenting indications of health. The health-related interaction server 120 may implement the method 900, for example.

A set of visual elements, such as the tiles further discussed with reference to FIGS. 2, 3A, and 3B, may be displayed on a system user device (block 902). For example, the health-related interaction server 120 may cause the virtual dashboard 200 including the tiles 202 to be displayed on one or more of the system user devices 150. It may then be determined if a selection of one of the displayed visual elements is received from one of the system user devices 150 (block 904). If no selection of a visual element is received, the flow may revert to block 902 where the originally displayed visual elements continue to be displayed.

If, however, an indication of a selection (e.g., via a click or tap) of a visual element is received, the flow may continue to block 906 where detailed visual elements corresponding to the selected visual element are determined. These detailed visual elements may include different types of indications of health as compared with the selected visual element, and/or the detailed visual element may include similar types of indications of health presented in different manners. Upon determining the detailed visual elements, the detailed visual elements are then displayed on the system user device (e.g., as prompted by the health-related interaction server 120) (block 908). The method 900 may include additional, less, or alternate actions, including those discussed elsewhere herein.

XIV. Requesting Exemplary Reports about the Health of Applications

In some aspects, health-related interaction servers, such as the health-related interaction server 120, may generate reports summarizing the health of applications and/or the health of portions of a computing environment over a certain time period. These reports may include documents (e.g., PDF documents), pieces of correspondence (e.g., emails, mobile alerts, text messages), retrievable log files stored in a database, etc.

Figures 10A, 10B, 10C:
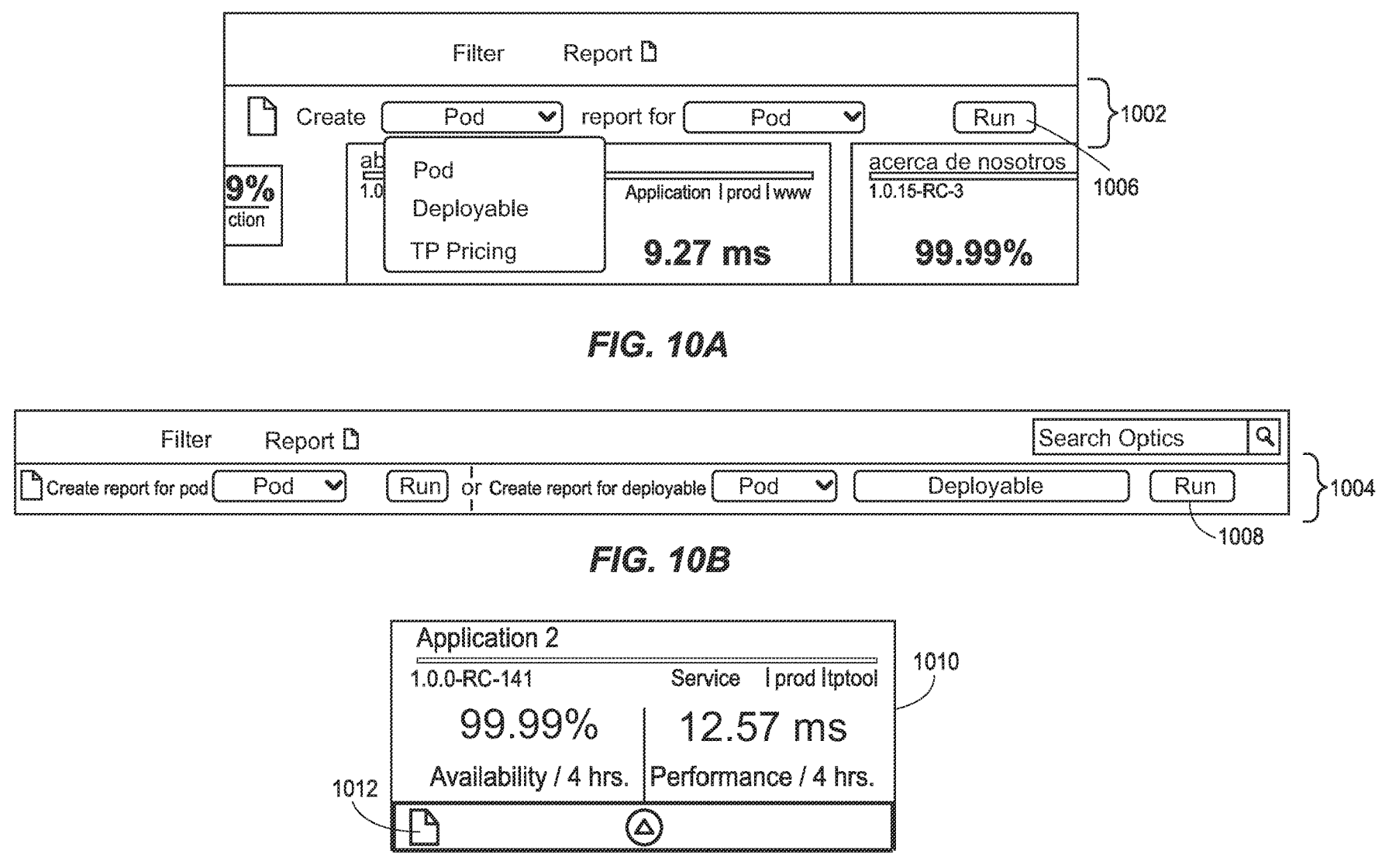

FIGS. 10A, 10B, and 10C illustrate various manners in which a user may request such a report within a virtual dashboard (e.g., displayed in a web browser or dedicated application). FIGS. 10A and 10B depict one or more report creation menus 1002 and 1004, respectively. A user may interact with (via clicks, taps, drags, etc.) the report creation menus to request a report of the health of various applications or portions of a computing environment. For example, a user may indicate a particular data center, type of application, modular component of a data center, etc. in one of the report creation menus 1002 and 1004 and select one or more buttons 1006 and 1008 to request a report corresponding to the indicated data center, type of application, modular component of a data center, etc.

Alternatively or additionally, a user may select one or more icons or portions of visual elements, such as tiles, within a virtual dashboard to request reports. For example, as illustrated in FIG. 10C, a tile 1010 corresponding to an application, "Application 15," may include a selectable icon 1012, which selectable icon 1012 allows a user to send a request (e.g., to the health-related interaction server 120) for a report summarizing the health of "Application 15" and/or portions of a computing environment implementing "Application 15."

XV. Exemplary Reports about Application/Environment Health

FIGS. 11, 12, and 13 illustrate three exemplary reports that may be generated (e.g., by the report generation module 134 of the health-related interaction server 120) in response to some of the interactions described with reference to FIGS. 10A, 10B, 10C, or in response to other suitable user interactions with a health-related interaction server. As mentioned above, the reports depicted in FIGS. 11, 12, and 13 may be formatted according to any suitable document format, embedded within communications (e.g., HTML format emails), presented in web browser, etc. Although certain indications of health, summarized indications of health, cost metrics, etc. are illustrated in the reports of FIGS. 11, 12, and 13, it is understood that any combination of these indications of health, cost metrics, etc. along with other values derivable from data from monitoring servers and/or input/output from applications may be included in generated reports.

FIG. 11 illustrates a modular component report 1100 corresponding to a modular component of a data center, such as pods implemented in one of the data centers 102 or 104. The modular component report 1100 may include by way of example, multiple columns 1102a-1102e summarizing counts and/or other indications of health for respective modular components of a data center (e.g., "DC 2/3"). Each of the columns 1102a-1102e may include, by way of example, a count of machines (e.g., virtual or physical servers) included in the respective modular component, a count a applications deployed in or implemented in the respective modular component, a percentage of memory of the modular component consumed by application deployed in the modular component, a percentage of the processors of the modular component consumed by an application deployed in the modular component, a pricing value for the application deployed in the modular component, and/or a total pricing value for the modular component.

FIG. 12 illustrates an application report 1200 corresponding to a particular release (1.0.4) of an application named "Application 14." The application report 1200 may also include a column 1202a-1202d corresponding to each of multiple modular components of a data center across which "Application 14" may be implemented. Also, for each of these columns 1202a-1202d, the example application report 1200 may include summarized indications of health 1204a-1204f for instances of "Application 14" implemented on each of the modular components. The indications of health 1204a-1204f include average availabilities (e.g., measured as a percentage), average performances (e.g., measured as a length of time), average throughputs (e.g., in transactions per second), a total number of executions or "hits," a total number of failures, and/or a total number of exceptions for "Application 14" in a certain time period.

FIG. 13 illustrates a pricing report 1300 corresponding to a computing environment, or data centers included in a computing environment operated by a company or organization. The pricing report 130 may allow users, such as administrators or business managers of the company or organization, to quickly assess the costs associated with the operation of a computing environment. The health-related interaction server 120 may generate the costs included in such a pricing report based upon memory, processors, storage, etc. use of applications implemented in the computing environment (e.g., on a data center by data center basis) and pre-defined measures of cost per memory, storage, processor time, etc. In particular, the pricing report may include estimated and/or historical values for a daily cost of operating one or more data centers or one or more modular portions of the one or more data centers, a monthly cost of operating the one or more data centers or the one or more modular portions, a yearly cost of operating the one or more data centers or the one or more modular portions, and/or a subtotal of daily, monthly, or yearly costs for operating the one or more data centers or the one or more modular portions. The pricing report 1300 may represent these costs in one or more tables 1302a and 1302b.

XVI. Exemplary Method for Generating Reports

Figure 14:
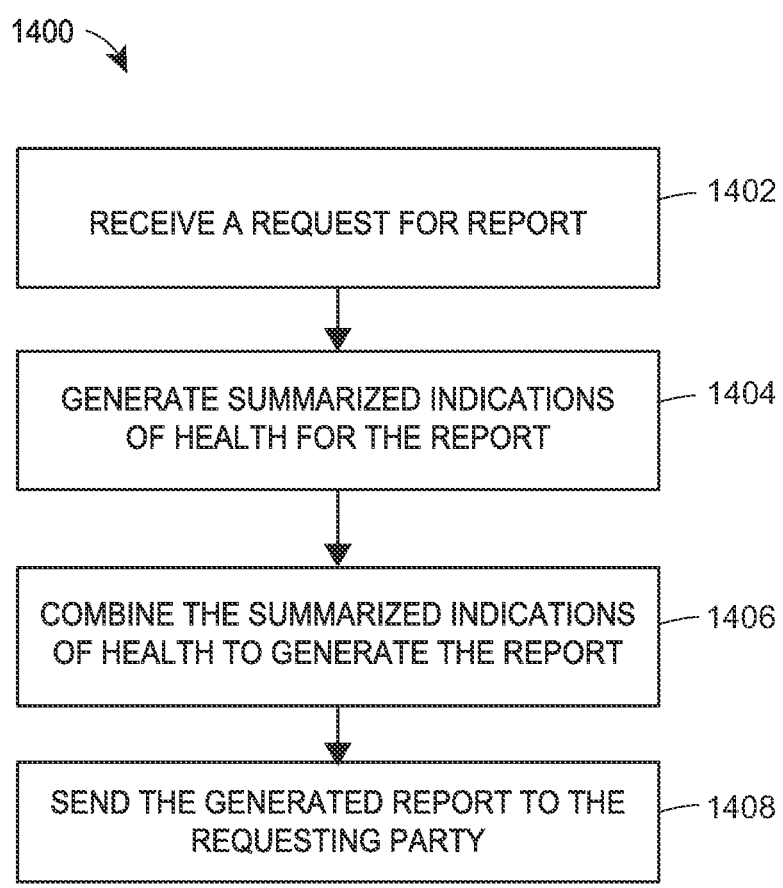
FIG. 14 is a flow chart illustrating an exemplary method for generating reports summarizing the health of applications or portions of a computing environment.

FIG. 14 is a high level flow chart of an exemplary method 1400, or routine or process, for generating reports summarizing the health of applications and/or portions of a computing environment. The health-related interaction server 120 (e.g., the report creation module 134, in particular) may implement the method 900, for example.

A request may be received for a report (block 1402). In some implementations, a web browser may generate a request based upon interactions with a virtual dashboard, as further discussed with reference to FIGS. 10A, 10B, and 10C, and send the request to the health-related interaction server 120. The request may include indications of particular applications, particular data centers, particular modular components of data centers, etc. for which the report was requested.

Summarized indications of health may then be generated (block 1404). The health-related interaction server 120 may generate such summarized indications of health, as depicted in FIGS. 11, 12, and 13, by transforming and/or combining indications of health for individual applications, analyzing files and/or data generated by applications, analyzing files and/or data generated by operating systems, batch systems, etc. corresponding to the computing environment, retrieving and analyzing data from monitoring servers, etc.

The summarized indications of health may be combined into one or more reports (block 1406). In some cases, the health-related interaction server 120 may generate multiple reports in response to a single request (e.g., multiple reports, each corresponding to a particular data center), and, in other cases, the health-related interaction server 120 may generate a single report in response to the request. In any event, the health-related interaction server 120 may organize summarized indications of health into various tables, graphs, plots, icons, or other report elements and generate the one or more reports including the organized report elements.

A health-related interaction server may then send the generated one or more reports to the requesting party (block 1408). For example, the health-related interaction server 120 may send one or more PDF reports as attachments via an email message to an email address of a requesting party. Alternatively or additionally, the health-related interaction server 120 may cause the reports to be displayed within a web browser or dedicated application executing on one of the system user devices 150.

In some implementations, the health-related interaction server 120 may automatically generate reports, such as pricing, application, and/or modular component reports, at periodic or pre-defined times and automatically send these reports to certain parties. For example, the health-related interaction server 120 may be configured to automatically generate a pricing report at the end of every week and email a PDF copy of the pricing report to one or more employees of a company. In this manner, the health-related interaction server 120 may update individuals about the health of a computing environment without a need for the individuals to remember to request reports. The method 1400 may include additional, fewer, or alternate actions, including those discussed elsewhere herein.

XVII. Exemplary Computer-Implemented Method

In one aspect, a computer-implemented method may include: (1) retrieving, via a computer network, data about the health of a plurality of applications executing in a computing environment, wherein at least some of the data about the health of the plurality of applications is generated while at least some of the plurality of applications are performing respective functions in the computing environment; (2) determining, by a one or more processors, a plurality of indications of health based upon the data about the health of the plurality of applications, each of the plurality of indications of health corresponding to one of the plurality of applications, and each of the plurality of indications of health indicating one of: (i) an availability of the corresponding one of the plurality of applications to perform the respective functions of the corresponding one of the plurality of applications, or (ii) a performance of the corresponding one of the plurality of applications in performing the respective functions of the corresponding one of the plurality of applications; (3) determining, by the one or more processors, an indication of an overall health of a portion of the computing environment based upon the plurality of indications of health of the plurality of applications, the portion of the computing environment implementing two or more of the plurality of applications; and/or (4) generating, by the one or more processors, a plurality of visual elements to be displayed on remote user devices. The one of the plurality of visual elements may present the indication of the overall health of the portion of the computing environment, and/or other of the plurality of visual elements may present at least some of the plurality of indications of health of the plurality of applications. The method may also include (5) sending, via the computer network, the plurality of visual elements to at least one of the remote user devices. The method may include additional, fewer, or alternate actions, including those discussed elsewhere herein.

For instance, generating the plurality of visual elements may include generating the plurality of visual elements such that each of the visual elements is selectable. The method may also include receiving, from one of the remote user devices via the computer network, a selection of a first visual element of the plurality of visual elements, wherein the first visual elements presents a first indication of health corresponding to a first application; generating, by the one or more processors, a second visual element different from the first visual element, the second visual element presenting a second indication of health corresponding to the first application, wherein the second indication of health is different than the first indication of health; and/or in response to the selection of the first visual element, sending, via the computer network, the second visual element to the one of the remote user devices. The first indication of health may indicate the availability or the performance of the first application over a first time period, the second indication of health may indicate the availability or the performance of the first application over a second time period, and/or the second time period may be longer than the first time period. The first indication of health may be a single numerical value representing the availability or the performance of the first application, and/or the second indication of health may include multiple numerical values representing the availability or the performance of the first application. The multiple numerical values may represent at least two or more of a frequency of certain events, a count of certain events, a rate, and/or a throughput corresponding to the first application.

Further, the one of the plurality of visual elements presenting the indication of the overall health of the portion of the computing environment may be expandable, upon a selection by a user of one of the remote user devices, to present details about the performance or the availability of subdivisions of the portion of the computing environment. The performance of the corresponding one of the plurality of applications may be a time taken by the corresponding one of the plurality of application to complete some or all of the corresponding functions of the corresponding one of the plurality of applications. The performance of the corresponding one of the plurality of applications may be at least one of a frequency of certain events, a count of certain events, a rate, and/or a throughput measured while the corresponding one of the plurality of applications completes some or all of the corresponding functions of the corresponding one of the plurality of applications.

The portion of the computing environment may be one of a plurality of data centers. The portion of the computing environment may correspond to one of a plurality of divisions of a company. Additionally or alternatively, the portion of the computing environment may correspond to one of a plurality of sections of the computing environment, each of the plurality of sections of the computing environment being devoted to a stage of development of ones of the plurality of applications implemented in the section of the computing environment.

The method may also include: receiving, from one of the remote user devices via the computer network, a request to filter the plurality of visual elements; determining, by the one or more processors, a subset of the plurality of visual elements based upon the request to filter the plurality of visual elements; and/or in response to the selection of the request to filter the plurality of visual elements, sending, via the computer network, the subset of the plurality of visual element to the one of the remote user devices. The request to filter the plurality of visual elements may include an identification of one of a plurality of data centers, and the subset of the plurality of visual elements may present only ones of the plurality of indications of health corresponding to ones of the plurality of applications implemented at the one of the plurality of data centers. The request to filter the plurality of visual elements may include an identification of one of a plurality of data centers and one or more modular components of the one of the plurality of data centers, and the subset of the plurality of visual elements may present only ones of the plurality of indications of health corresponding to ones of the plurality of applications implemented at the one of the plurality of data centers on the one or more modular components.

The method may include: receiving, from one of the remote user devices via the computer network, one or more search variables; matching, by the one or more processors, a subset of the plurality of visual elements to the one or more search variables; and/or in response to the received one or more search variables, sending, via the computer network, the subset of the plurality of visual element to the one of the remote user devices. The one or more search variables include one or more keywords, and matching the subset of the plurality of visual elements to the one or more search variables may include: matching at least one of application identifications, server identifications, company division identifications, development stage identifications, or functionality identifications indicated in the one or more keywords with one or more of the plurality of applications or one or more portions of the computing environment, and/or identifying the subset of the plurality of visual elements that present ones of the plurality of indications of health corresponding to the one or more of the plurality of applications or the one or more portions of the computing environment.

XVIII. Exemplary Computer Device

In one aspect, a computer or computing device may include: one or more processors; and one or more non-transitory memories coupled to the one or more processors. The one or more non-transitory memories may include computer executable instructions stored therein that, when executed by the one or more processors, cause the one or more processors to: (a) receive, from one or more monitoring devices via a computer network, data about the health of a plurality of applications executing in a computing environment, wherein at least some of the data about the health of the plurality of applications is generated while the plurality of applications are performing respective functions in the computing environment, and/or (b) determine, based upon the data about the health of the plurality of applications, a value of at least one standard health metric for each of the plurality of applications, the at least one standard health metric may be defined in the same manner for all of the plurality of applications. The at least one standard health metric may be a measure of one of: (i) an availability to perform the respective functions in the computing environment, or (ii) a performance in performing the respective functions in the computing environment. The computer executable instructions may further cause the one or more processors to: (c) receive, from a remote user device, a request for a health report summarizing the health of one of one or more of the plurality of applications or a portion of the computing environment, (d) generate the health report based upon the values of the at least one standard health metric for the plurality of applications, and/or (e) send, via the computer network, the generated health report to the remote user device. The computer or computing device may have additional, less, or alternate functionality, including that discussed elsewhere herein.

For instance, the request for a health report may include an identification of one or more modular portions of the computing environment, and the generated health report may summarize the health of the identified one or more modular portions based upon the values of the at least one standard health metric for particular ones of the plurality of applications implemented in the one or more modular portions. The health report may include at least two of: (i) a count of at least one of the particular ones of the plurality of applications implemented in the one or more modular portions or server in the one or more modular portions, (ii) a measure of at least one of processors consumption or memory consumption in the one or more modular portions, and/or (iii) a pricing value for consumed resources or services of the one or more modular portions. The request for a health report may include an identification of one of the plurality of applications, and the generated health report summarizes the health of the identified one of the plurality of applications over a time period based upon the values of the at least one standard health metric generated during the time period for the identified one of the plurality of applications. The health report may include at least two of: (i) an average availability of the identified one of the plurality of applications during the time period, (ii) an average performance of the identified one of the plurality of applications in performing the respective functions during the time period, (iii) an average throughput of the identified one of the plurality of applications during the time period, and/or (iv) a count of at least one of executions, failures, or exceptions of the identified one of the plurality of applications during the time period. The request for a health report may include a request for pricing information, and the generated health report may summarize pricing information of the one of one or more of the plurality of applications or the portion of the computing environment. The health report may include at least two of: (i) a daily cost of operating one or more data centers in the computing environment or one or more modular portions of the one or more data centers, (ii) a monthly cost of operating the one or more data centers or the one or more modular portions, (iii) a yearly cost of operating the one or more data centers or the one or more modular portions, or (iv) a subtotal of daily, monthly, or yearly costs for operating the one or more data centers or the one or more modular portions.

Upon reading this disclosure, those of ordinary skill in the art will appreciate still additional alternative structural and functional designs for system and a method for assessing and presenting information about the health of applications implemented in a computing environment. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

We claim:

1. A computer-implemented method comprising:
retrieving, via a computer network, data about the health of a plurality of applications executing in a computing environment, wherein at least some of the data about the health of the plurality of applications is generated while at least some of the plurality of applications are performing respective functions in the computing environment;
determining, by one or more processors, a plurality of indications of health based upon the data about the health of the plurality of applications, each of the plurality of indications of health corresponding to one of the plurality of applications, at least one of the plurality of indications of health based upon data generated directly by a corresponding one of the plurality of applications, and each of the plurality of indications of health indicating one of:
(i) an availability of the corresponding one of the plurality of applications to perform the respective functions of the corresponding one of the plurality of applications, or
(ii) a performance of the corresponding one of the plurality of applications in performing the respective functions of the corresponding one of the plurality of applications;
determining, by the one or more processors, an indication of an overall health of a portion of the computing environment based upon the plurality of indications of health of the plurality of applications, the portion of the computing environment implementing two or more of the plurality of applications;
generating, by the one or more processors, a plurality of visual elements to be displayed on remote user devices,
wherein one of the plurality of visual elements presents the indication of the overall health of the portion of the computing environment, and
wherein other of the plurality of visual elements present at least some of the plurality of indications of health of the plurality of applications; and sending, via the computer network, the plurality of visual elements to at least one of the remote user devices.

2. The computer-implemented method of claim 1, wherein generating the plurality of visual elements includes generating the plurality of visual elements such that each of the visual elements is selectable.

3. The computer-implemented method of claim 2, further comprising:
receiving, from one of the remote user devices via the computer network, a selection of a first visual element of the plurality of visual elements, wherein the first visual elements presents a first indication of health corresponding to a first application;
generating, by the one or more processors, a second visual element different from the first visual element, the second visual element presenting a second indication of health corresponding to the first application, wherein the second indication of health is different than the first indication of health; and
in response to the selection of the first visual element, sending, via the computer network, the second visual element to the one of the remote user devices.

4. The computer-implemented method of claim 3, wherein the first indication of health indicates the availability or the performance of the first application over a first time period, wherein the second indication of health indicates the availability or the performance of the first application over a second time period, and wherein the second time period is longer than the first time period.

5. The computer-implemented method of claim 3, wherein the first indication of health is a single numerical value representing the availability or the performance of the first application, and wherein the second indication of health includes multiple numerical values representing the availability or the performance of the first application.

6. The computer-implemented method of claim 5, wherein the multiple numerical values represent at least two or more of a frequency of certain events, a count of certain events, a rate, or a throughput corresponding to the first application.

7. The computer-implemented method of claim 1, wherein the one of the plurality of visual elements presenting the indication of the overall health of the portion of the computing environment is expandable, upon a selection by a user of one of the remote user devices, to present details about the performance or the availability of subdivisions of the portion of the computing environment.

8. The computer-implemented method of claim 1, wherein the performance of the corresponding one of the plurality of applications is a time taken by the corresponding one of the plurality of application to complete some or all of the corresponding functions of the corresponding one of the plurality of applications.

9. The computer-implemented method of claim 1, wherein the performance of the corresponding one of the plurality of applications is at least one of a frequency of certain events, a count of certain events, a rate, or a throughput measured while the corresponding one of the plurality of applications completes some or all of the corresponding functions of the corresponding one of the plurality of applications.

10. The computer-implemented method of claim 1, wherein the portion of the computing environment is one of a plurality of data centers.

11. The computer-implemented method of claim 1, wherein the portion of the computing environment corresponds to one of a plurality of divisions of a company.

12. The computer-implemented method of claim 1, wherein the portion of the computing environment corresponds to one of a plurality of sections of the computing environment, each of the plurality of sections of the computing environment devoted to a stage of development of ones of the plurality of applications implemented in the section of the computing environment.

13. The computer-implemented method of claim 1, further comprising:
receiving, from one of the remote user devices via the computer network, a request to filter the plurality of visual elements;
determining, by the one or more processors, a subset of the plurality of visual elements based upon the request to filter the plurality of visual elements; and
in response to the selection of the request to filter the plurality of visual elements, sending, via the computer network, the subset of the plurality of visual element to the one of the remote user devices.

14. The computer-implemented method of claim 13, wherein the request to filter the plurality of visual elements includes an identification of one of a plurality of data centers, and wherein the subset of the plurality of visual elements presents only ones of the plurality of indications of health corresponding to ones of the plurality of applications implemented at the one of the plurality of data centers.

15. The computer-implemented method of claim 13, wherein the request to filter the plurality of visual elements includes an identification of one of a plurality of data centers and one or more modular components of the one of the plurality of data centers, and wherein the subset of the plurality of visual elements presents only ones of the plurality of indications of health corresponding to ones of the plurality of applications implemented at the one of the plurality of data centers on the one or more modular components.

16. The computer-implemented method of claim 1, further comprising:
receiving, from one of the remote user devices via the computer network, one or more search variables;
matching, by the one or more processors, a subset of the plurality of visual elements to the one or more search variables; and
in response to the received one or more search variables, sending, via the computer network, the subset of the plurality of visual element to the one of the remote user devices.

17. The computer-implemented method of claim 16, wherein the one or more search variables include one or more keywords, and wherein matching the subset of the plurality of visual elements to the one or more search variables includes:
matching at least one of application identifications, server identifications, company division identifications, development stage identifications, or functionality identifications indicated in the one or more keywords with one or more of the plurality of applications or one or more portions of the computing environment, and
identifying the subset of the plurality of visual elements that present ones of the plurality of indications of health corresponding to the one or more of the plurality of applications or the one or more portions of the computing environment.

18. A computer device comprising:
one or more processors; and
one or more non-transitory memories coupled to the one or more processors, wherein the one or more non-transitory memories include computer executable instructions stored therein that, when executed by the one or more processors, cause the one or more processors to:
- receive, from one or more monitoring devices via a computer network, data about the health of a plurality of applications executing in a computing environment, wherein at least some of the data about the health of the plurality of applications is generated while the plurality of applications are performing respective functions in the computing environment,
- determine, based upon the data about the health of the plurality of applications, wherein the data about the health of the plurality of applications is generated directly by the plurality of applications, a value of at least one standard health metric for each of the plurality of applications, wherein the at least one standard health metric is defined in the same manner for all of the plurality of applications, the at least one standard health metric being a measure of one of:
  - (i) an availability to perform the respective functions in the computing environment, or
  - (ii) a performance in performing the respective functions in the computing environment,
- receive, from a remote user device, a request for a health report summarizing the health of one of one or more of the plurality of applications or a portion of the computing environment,
- generate the health report based upon the values of the at least one standard health metric for the plurality of applications, and
- send, via the computer network, the generated health report to the remote user device.

19. A computer-implemented method of presenting an overall health of a computing environment on a display, the method comprising:
- presenting health information for a plurality of applications running in the computing environment, the health information based upon data generated directly by a corresponding one of the plurality of applications and including a virtual depiction of a health of each application, the virtual depiction of the health for each application comprising:
  - (i) a graphical or textual representation of a first current status of the availability of the respective application, and
  - (ii) a graphical or textual representation of a second current status of the performance of the respective application to facilitate an overall understanding of the health of the computing environment and/or identification of individual applications, or groupings of applications, running that are exhibiting poor behavior and may need refinement, adjustment, optimization, and/or cancellation.

20. The method of claim 19, wherein the availability is depicted or expressed as a percentage and the performance is depicted or expressed as a speed or time-based performance.

* * * * *